United States Patent
Pitigoi-Aron et al.

(10) Patent No.: US 11,531,608 B2
(45) Date of Patent: Dec. 20, 2022

(54) ERROR SIGNALING WINDOWS FOR PHASE-DIFFERENTIAL PROTOCOLS

(71) Applicant: QUALCOMM Incorporated, San Diego, CA (US)

(72) Inventors: Radu Pitigoi-Aron, San Jose, CA (US); Richard Dominic Wietfeldt, San Diego, CA (US); Lalan Jee Mishra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 17/027,541

(22) Filed: Sep. 21, 2020

(65) Prior Publication Data

US 2022/0091952 A1  Mar. 24, 2022

(51) Int. Cl.
| | |
|---|---|
| G06F 11/00 | (2006.01) |
| G06F 11/30 | (2006.01) |
| G06F 11/07 | (2006.01) |
| G06F 11/10 | (2006.01) |
| G06F 13/42 | (2006.01) |

(52) U.S. Cl.
CPC ...... *G06F 11/3027* (2013.01); *G06F 11/0757* (2013.01); *G06F 11/0772* (2013.01); *G06F 11/102* (2013.01); *G06F 13/4291* (2013.01)

(58) Field of Classification Search
CPC ............ G06F 11/3027; G06F 11/0757; G06F 11/0772; G06F 11/102; G06F 11/0745; G06F 11/0751; G06F 11/10; G06F 13/4291
See application file for complete search history.

(56) References Cited

U.S. PATENT DOCUMENTS

| | | | |
|---|---|---|---|
| 7,975,201 B2 * | 7/2011 | Whitby-Strevens | H03M 13/31 714/752 |
| 2016/0094336 A1 * | 3/2016 | Schenzinger | H04L 25/4904 375/295 |
| 2017/0109305 A1 | 4/2017 | Liu et al. | |
| 2018/0181532 A1 | 6/2018 | Pitigoi-Aron | |
| 2019/0356412 A1 | 11/2019 | Pitigoi-Aron et al. | |
| 2019/0385057 A1 * | 12/2019 | Litichever | H04L 63/14 |
| 2020/0212943 A1 * | 7/2020 | Banin | H04B 1/04 |
| 2020/0349254 A1 * | 11/2020 | Walthinsen | H04L 63/1416 |

OTHER PUBLICATIONS

International Search Report and Written Opinion—PCT/US2021/044368—ISA/EPO—dated Nov. 23, 2021.

* cited by examiner

*Primary Examiner* — Joseph D Manoskey
(74) *Attorney, Agent, or Firm* — Qualcomm Incorporated

(57) ABSTRACT

Systems, methods, and apparatus for error signaling on a serial bus are described. An apparatus includes a bus interface configured to couple the apparatus to a serial bus, a phase-differential decoder configured to decode data from transitions between pairs of symbols in a sequence of symbols received from the serial bus, each symbol being representative of signaling state of the serial bus, and a processor configured to detect an indicator of an error signaling window in signaling state of two wires of the serial bus, the indicator of the error signaling window corresponding to a prohibited combination of symbols or a delay in control signaling, signaling an error through the bus interface during the error signaling window when an error is detected in the sequence of symbols or in timing of the indicator of the error signaling window.

26 Claims, 26 Drawing Sheets

ERROR SIGNALING WINDOWS FOR PHASE-DIFFERENTIAL PROTOCOLS

TECHNICAL FIELD

The present disclosure relates generally to a serial bus interface between processing circuits and peripheral devices and, more particularly, to detecting and reporting errors in a sequence of symbols transmitted over the serial bus or errors in data decoded from the sequence of symbols.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a multi-drop serial bus or a parallel bus. General-purpose serial interfaces known in the industry include the Inter-Integrated Circuit (I2C or I²C) serial interface and its derivatives and alternatives.

The Mobile Industry Processor Interface (MIPI) Alliance defines standards for the Improved Inter-Integrated Circuit (I3C) serial interface, the Radio Frequency Front-End (RFFE) interface, the System Power Management Interface (SPMI) and other interfaces. These interfaces may be used to connect processors, sensors and other peripherals, for example. In some interfaces, multiple bus masters are coupled to the serial bus such that two or more devices can serve as bus master for different types of messages transmitted on the serial bus. SPMI protocols define a hardware interface that may be implemented between baseband or application processors and peripheral components. In some instances, SPMI protocols are implemented to support power management operations within a device.

Conventional I3C protocols are typically used to control half-duplex operations on a serial bus. Demands for higher throughput may be met through the use of higher clock rates or other encoding schemes. In many conventional systems, error reporting on a half-duplex serial bus can cause collisions data rates and for certain encoding schemes that transmit data in encoded blocks or sequences of signaling.

SUMMARY

Certain aspects of the disclosure relate to systems, apparatus, methods and techniques that provide pre-defined patterns within the data stream, that can be unequivocally identified by a receiving device and that improve the integrity of high-speed communication interfaces, including interfaces that involve phase-differential encoding.

In various aspects of the disclosure, a method for receiving data at a device coupled to a serial bus includes receiving a sequence of symbols, each symbol being representative of signaling state of the serial bus, decoding the data from transitions between pairs of symbols in the sequence of symbols, detecting an indicator of an error signaling window in signaling state of two wires of the serial bus, the indicator of the error signaling window corresponding to a prohibited combination of symbols or a delay in control signaling, signaling an error during the error signaling window when an error is detected in the sequence of symbols or in timing of the indicator of the error signaling window.

In various aspects of the disclosure, an apparatus includes a bus interface configured to couple the apparatus to a serial bus, a phase-differential decoder configured to decode data from transitions between pairs of symbols in a sequence of symbols received from the serial bus, each symbol being representative of signaling state of the serial bus, and a processor configured to detect an indicator of an error signaling window in signaling state of two wires of the serial bus, the indicator of the error signaling window corresponding to a prohibited combination of symbols or a delay in control signaling, signaling an error through the bus interface during the error signaling window when an error is detected in the sequence of symbols or in timing of the indicator of the error signaling window.

In various aspects of the disclosure, a computer-readable medium stores code, instructions and/or data, including code which, when executed by a processor, causes the processor to receive a sequence of symbols, each symbol being representative of signaling state of the serial bus, decode the data from transitions between pairs of symbols in the sequence of symbols, detect an indicator of an error signaling window in signaling state of two wires of the serial bus, the indicator of the error signaling window corresponding to a prohibited combination of symbols or a delay in control signaling, and signal an error during the error signaling window when an error is detected in the sequence of symbols or in timing of the indicator of the error signaling window.

In various aspects of the disclosure, an apparatus includes means for receiving a sequence of symbols, each symbol being representative of signaling state of the serial bus, means for decoding the data from transitions between pairs of symbols in the sequence of symbols, means for detecting an indicator of an error signaling window in signaling state of two wires of the serial bus, the indicator of the error signaling window corresponding to a prohibited combination of symbols or a delay in control signaling, and means for signaling an error during the error signaling window when an error is detected in the sequence of symbols or in timing of the indicator of the error signaling window.

In various aspects of the disclosure, a method for transmitting data from a device coupled to a serial bus includes encoding the data in transitions between pairs of symbols in a sequence of symbols, each symbol defining signaling state of the serial bus, transmitting the sequence of symbols over the serial bus, transmitting an indicator of an error signaling window in signaling state of two wires of the serial bus, the indicator of the error signaling window corresponding to a prohibited combination of symbols or a delay in control signaling, receiving signaling in the error signaling window indicating an error in the sequence of symbols or an error in timing of the indicator of the error signaling window, and terminating transmission of the data when signaling indicating the error is received in the error signaling window.

In various aspects of the disclosure, an apparatus includes a bus interface configured to couple the apparatus to a serial bus, a phase-differential encoder configured to encode data in transitions between pairs of symbols in a sequence of symbols each symbol defining signaling state of the serial bus, and a processor configured to transmit an indicator of an error signaling window in signaling state of two wires of the serial bus, the indicator of the error signaling window corresponding to a prohibited combination of symbols or a delay in control signaling, receive signaling in the error signaling window indicating an error in the sequence of symbols or an error in timing of the indicator of the error signaling window and terminate transmission of the data when signaling indicating the error is received in the error signaling window.

In various aspects of the disclosure, a computer-readable medium stores code, instructions and/or data, including code which, when executed by a processor, causes the processor to encode the data in transitions between pairs of symbols in a sequence of symbols, each symbol defining signaling state of the serial bus, transmit the sequence of symbols over the serial bus, transmit an indicator of an error signaling window in signaling state of two wires of the serial bus, the indicator of the error signaling window corresponding to a prohibited combination of symbols or a delay in control signaling, receive signaling in the error signaling window indicating an error in the sequence of symbols or an error in timing of the indicator of the error signaling window and terminate transmission of the data when signaling indicating the error is received in the error signaling window.

In various aspects of the disclosure, an apparatus for managing transactions executed on a serial bus includes means for encoding the data in transitions between pairs of symbols in a sequence of symbols, each symbol defining signaling state of the serial bus, means for transmitting the sequence of symbols over the serial bus, means for transmitting an indicator of an error signaling window in signaling state of two wires of the serial bus, the indicator of the error signaling window corresponding to a prohibited combination of symbols or a delay in control signaling, means for receiving signaling in the error signaling window indicating an error in the sequence of symbols or an error in timing of the indicator of the error signaling window and means for terminating transmission of the data when signaling indicating the error is received in the error signaling window.

DETAILED DESCRIPTION

Figure 1:
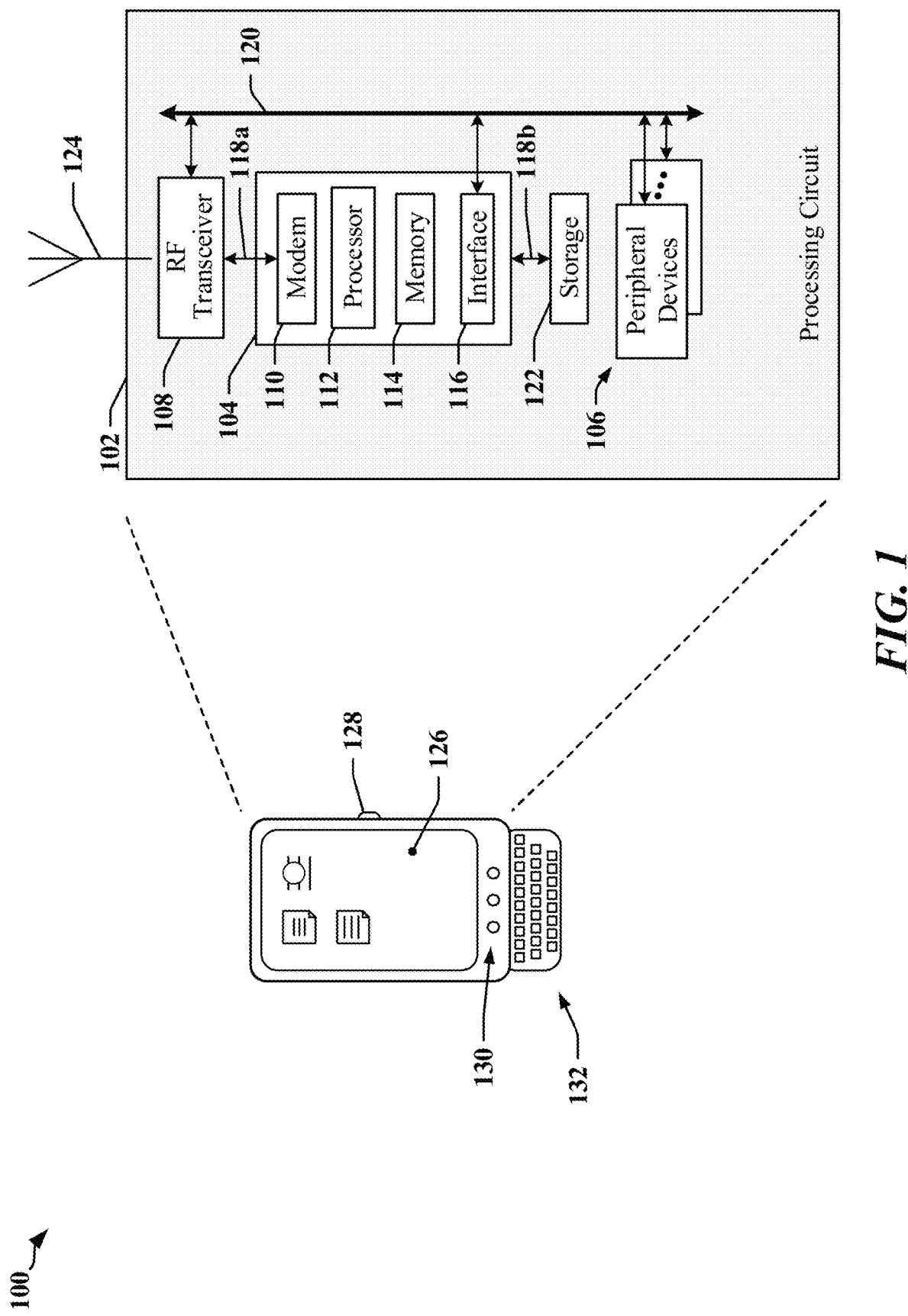
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects and features will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include application-specific IC (ASIC) devices, SoCs and/or other IC devices often employ a shared communication interface that may include a serial bus or other data communication link to connect processors with modems and other peripherals. The serial bus may be operated in accordance with specifications and protocols defined by a standards body. In certain implementations disclosed herein, the serial bus is operated in accordance with protocols such as I2C and/or I3C protocols, which define timing relationships between signals transmitted over the serial bus. Certain aspects disclosed herein relate to systems, apparatus, methods and techniques that provide opportunities for a slave device to report on parity errors before a transaction has been completely transmitted.

Certain aspects of this disclosure relate to devices that transmit and receive phase-differential encoded signals over a serial bus. In one example, a receiving device may receive a sequence of symbols, each symbol being representative of signaling state of the serial bus, decode the data from transitions between pairs of symbols in the sequence of symbols, detect an indicator of an error signaling window in signaling state of two wires of the serial bus, the indicator of the error signaling window corresponding to a prohibited combination of symbols or a delay in control signaling, and signal an error during the error signaling window when an error is detected in the sequence of symbols or in timing of the indicator of the error signaling window.

Example of an Apparatus with a Serial Data Link

According to certain aspects of this disclosure, a serial data link may be employed to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that employs a data communication bus. The apparatus 100 may include a processing circuit 102 having multiple circuits and/or devices 104, 106 and/or 108, which may be implemented in one or more ASICs or in an SoC for example. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or in other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include non-transitory media, such as read-only memory (ROM), random-access memory (RAM), electrically erasable programmable ROM (EEPROM), flash cards, or other types memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls among other components. The operator controls may include switches or buttons 128, 130 and/or an integrated or external keypad 132. A user interface module may be configured to operate the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In some instances, the bus interface circuit 116 may be configured to operate in accordance with standards-defined communication specifications or protocols. The processing circuit 102 may include or control a power management function that configures and manages the operation of the apparatus 100.

Figure 2:
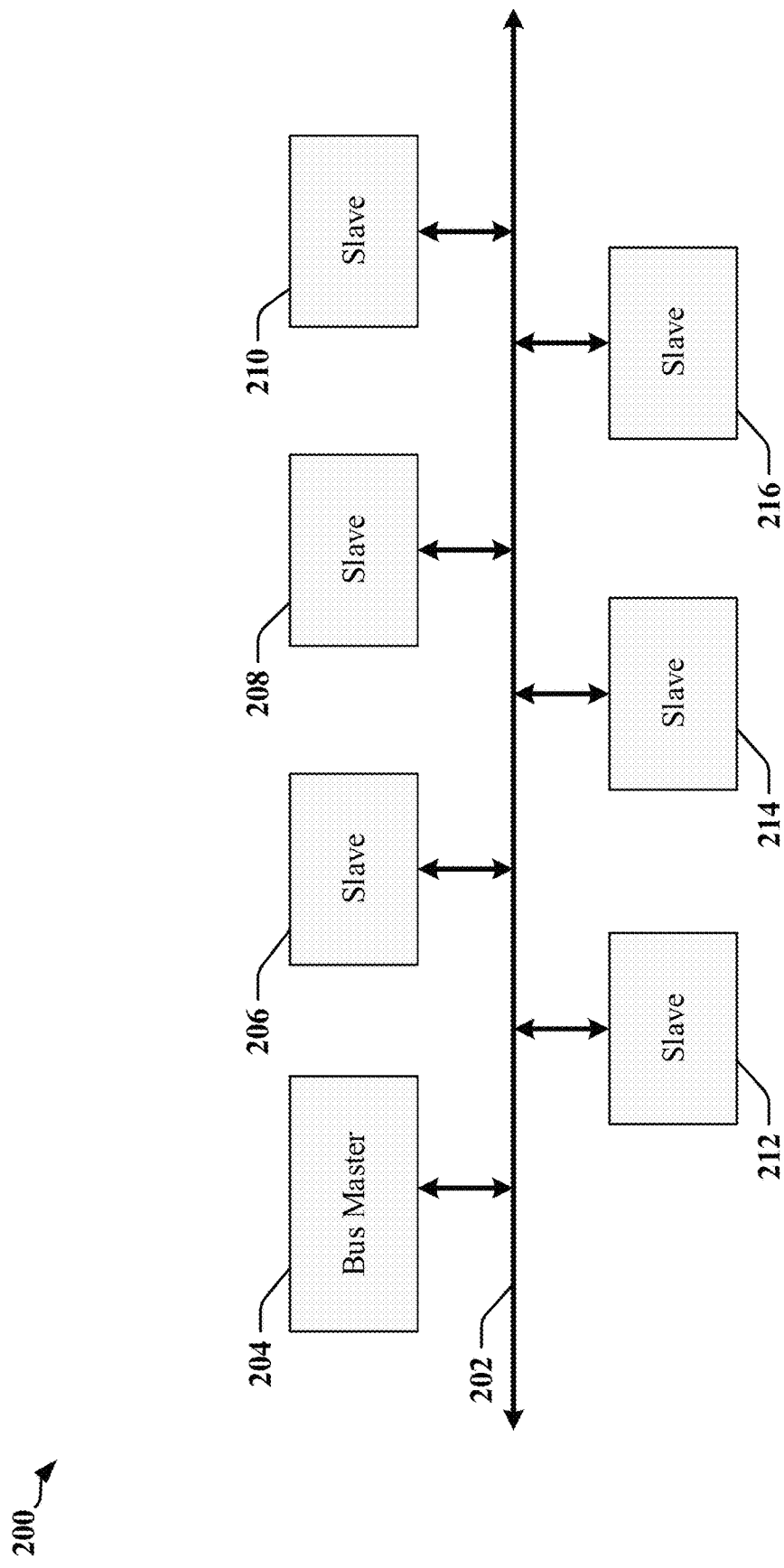
FIG. 2 illustrates a communication interface in which a plurality of devices is connected using a serial bus.

FIG. 2 illustrates a communication link 200 in which multiple devices 204, 206, 208, 210, 212, 214 and 216 are connected using a serial bus 202. In one example, the devices 204, 206, 208, 210, 212, 214 and 216 may be adapted or configured to communicate over the serial bus 202 in accordance with an I3C protocol. In some instances, one or more of the devices 204, 206, 208, 210, 212, 214 and 216 may alternatively or additionally communicate using other protocols, including an I2C protocol, for example.

Communication over the serial bus 202 may be controlled by a master device 204. In one mode of operation, the master device 204 may be configured to provide a clock signal that controls timing of a data signal. In another mode of operation, two or more of the devices 204, 206, 208, 210, 212, 214 and 216 may be configured to exchange data encoded in symbols that define signaling state of clock and data signals, where timing information is embedded in the transmission of the symbols.

Figure 3:
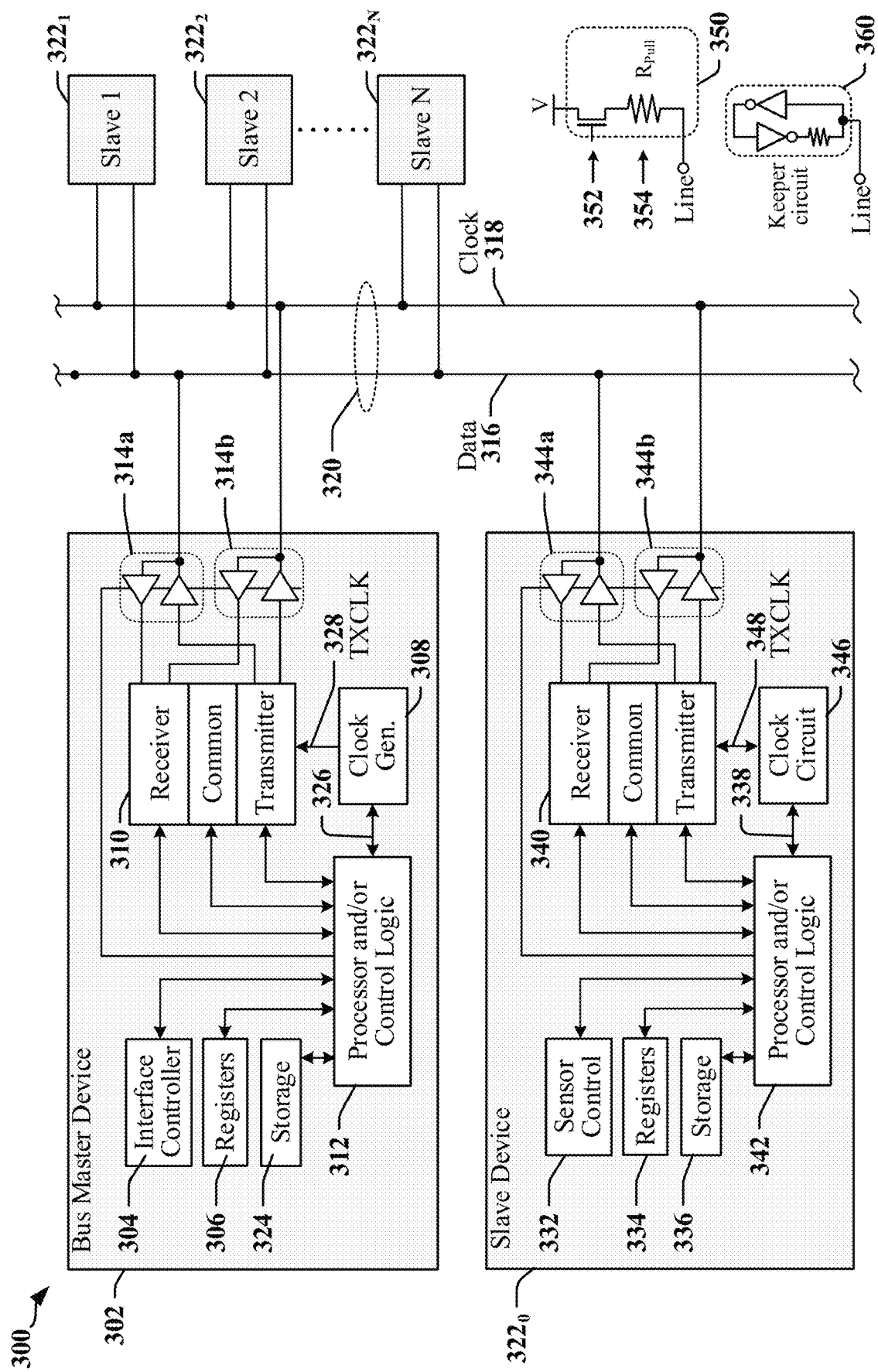
FIG. 3 illustrates certain aspects of an apparatus that includes multiple devices connected to a serial bus.

FIG. 3 illustrates certain aspects of an apparatus 300 that includes multiple devices 302, and $322_0$-$322_N$ coupled to a serial bus 320. The devices 302 and $322_0$-$322_N$ may be provided in one or more semiconductor IC devices, such as an application processor, SoC or ASIC. In various implementations, the devices 302 and $322_0$-$322_N$ can include, support or operate as a modem, a signal processing device, a display driver, a camera, a user interface, a sensor, a sensor controller, a media player, a transceiver, and/or other such components or devices. In some examples, one or more of the slave devices $322_0$-$322_N$ may be used to control, manage or monitor a sensor device. Communication between devices 302 and $322_0$-$322_N$ over the serial bus 320 is controlled by a bus master device 302. Certain types of bus can support multiple bus master devices 302.

In one implementation, a bus master device 302 includes an interface controller 304 that manages access to the serial bus, configures dynamic addresses for slave devices $322_0$-$322_N$ and/or generates a clock signal 328 to be transmitted on a clock line 318 of the serial bus 320. The bus master device 302 may include configuration registers 306 or other storage 324, and/or control logic 312 configured to handle protocols or higher-level functions. The control logic 312 may include a processing circuit such as a state machine, sequencer, signal processor or general-purpose processor. The bus master device 302 includes a transceiver 310 and line drivers/receivers 314a and 314b. The transceiver 310 may include receiver, transmitter and common circuits, where the common circuits may include timing, logic circuits and/or storage devices. In one example, the transmitter encodes and transmits data based on timing in the clock signal 328 provided by a clock generation circuit 308. Other timing clock signals 326 may be provided for the use of the control logic 312 and other functions, circuits or modules.

At least one device $322_0$-$322_N$ can be configured to operate as a slave device on the serial bus 320 and may include circuits and modules that support a display, an image sensor, and/or circuits and modules that control and communicate with one or more sensors that measure environmental conditions. In one example, a slave device 322o configured to operate as a slave device may provide a control function, module or circuit 332 that includes circuits and modules to support a display, an image sensor, and/or circuits and modules that control and communicate with one or more sensors that measure environmental conditions. The slave device 322o may include configuration registers 334 or other storage 336, control logic 342, a transceiver 340 and line drivers/receivers 344a and 344b. The control logic 342 may include a processing circuit such as a state machine, sequencer, signal processor or general-purpose processor. The transceiver 310 may include receiver, transmitter and common circuits, where the common circuits may include timing, logic circuits and/or storage devices. In one example, the transmitter encodes and transmits data based on timing in a clock signal 348 provided by clock generation and/or recovery circuits 346. The clock signal 348 may be derived from a signal received from the clock line 318. Other timing clock signals 338 may be provided for the use of the control logic 342 and other functions, circuits or modules.

The serial bus 320 may be operated in accordance with an I2C, I3C, RFFE, SPMI, or other protocol. At least one device 302, $322_0$-$322_N$ may be configured to operate as a master device and a slave device on the serial bus 320. Two or more devices 302, $322_0$-$322_N$ may be configured to operate as a master device on the serial bus 320.

In one example, the serial bus 320 may be operated in accordance with an I3C protocol. Devices that communicate using the I3C protocol can coexist on the same serial bus 320 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 320, in addition to data formats and aspects of bus control. In some aspects, the I2C and I3C protocols may define direct current (DC) characteristics affecting certain signal levels associated with the serial bus 320, and/or alternating current (AC) characteristics affecting certain timing aspects of signals transmitted on the serial bus 320. In some examples, a 2-wire serial bus 320 transmits data on a data line 316 and a clock signal on the clock line 318. In some instances, data may be encoded in the signaling state, or transitions in signaling state of the data line 316 and the clock line 318.

In some implementations, pull-up/pull-down circuits 350 may be coupled to the data line 316 and/or the clock line 318 to maintain the signaling state of the serial bus 320 when no device is actively driving the associated line, including during line turnaround when a first device ceases driving the line and before a second device begins actively driving the line. A pull-up/pull-down circuit 350 may be implemented using a variety of circuits. In the illustrated example, a pull-up/pull-down circuit 350 includes a resistor 354 that may be coupled to a voltage source through a switch 352. In one example, the voltage source may provide a voltage corresponding to one of two binary signaling states defined for the serial bus 320. In some instances, the switch 352 may be implemented as a suitably configured transistor. In some instances, the pull-up/pull-down circuit 350 is coupled directly to the voltage source and the switch 352 couples the pull-up/pull-down circuit 350 to the data line 316 or the clock line 318.

In some implementations, a keeper circuit 360 may be configured as a positive feedback circuit that drives the data line 316 and/or the clock line 318 through a high impedance output, and receives feedback from the data line 316 and/or the clock line 318 through a low impedance input. The keeper circuit 360 may be configured to maintain the last asserted signaling state on a line. The output of the keeper circuit 360 can be easily overcome by line drivers in the master device 302 or a slave device $322_0$-$322_N$.

Data Transfers Over a Serial Bus

Data transfers using I2C and I3C protocols to control signaling, command and payload transmissions are illustrated by way of example. However, certain concepts disclosed herein are applicable to other bus configurations and protocols, including RFFE and SPMI configurations and protocols. In one example, data may be transferred in accordance with an I3C HDR protocol that encodes data in ternary symbols (HDR-TSP), and HDR-TSP timeslots may be defined in terms of HDR-TSP words, where each slot may be expressed as a set of six successive recovered clock pulses, which is the equivalent number of clock pulses for an HDR-TSP word. In another example, data may be transferred in accordance with an I3C HDR double data rate (HDR-DDR) protocol, where timeslots may be defined in terms of HDR-DDR words and/or expressed as the number of clock pulses used to transmit an HDR-DDR word.

Figure 4:
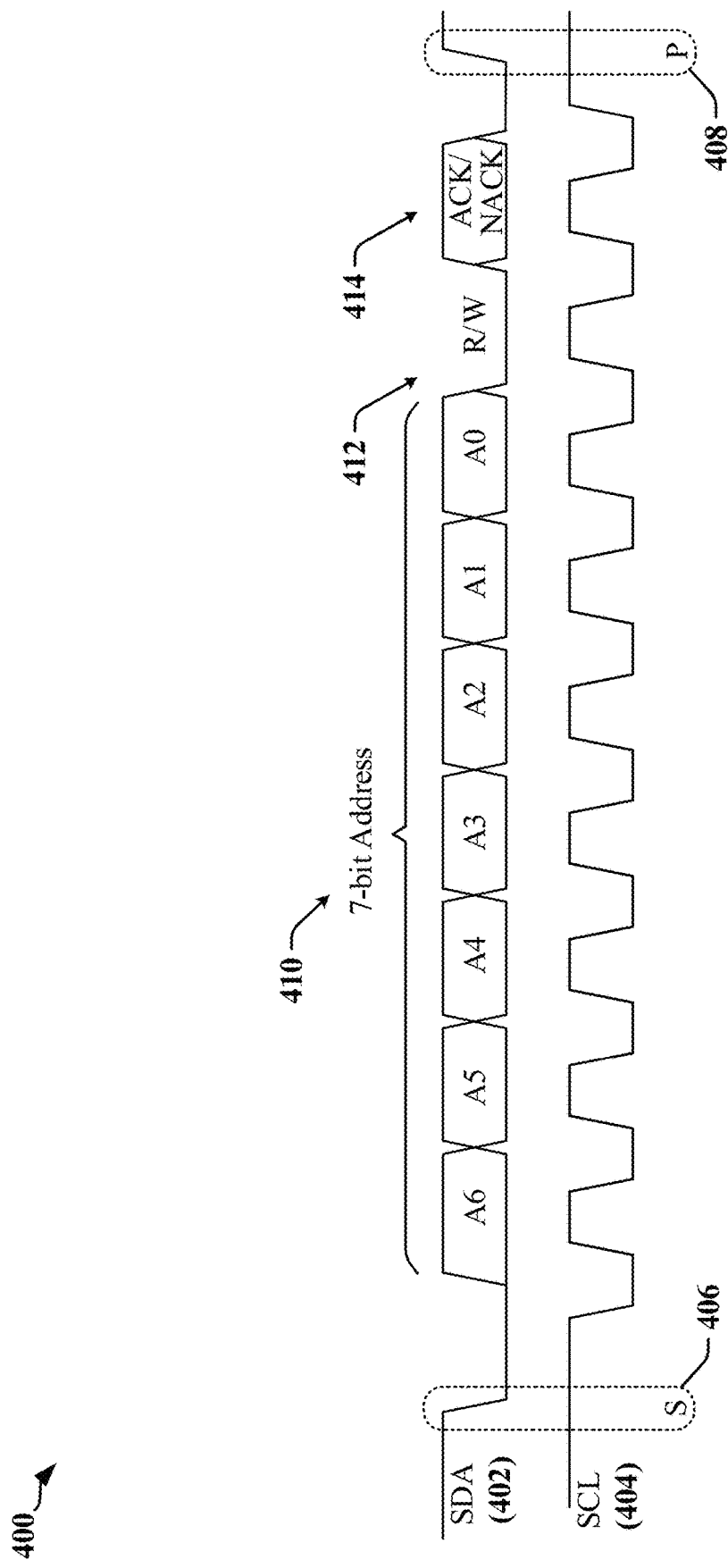
FIG. 4 illustrates timing related to a command word sent to a slave device in accordance with I2C protocols.

FIG. 4 illustrates an example of the timing 400 associated with an address word sent to a slave device in accordance with certain I2C and/or I3C protocols. In the example, a master device initiates the transaction with a start condition 406, whereby the SDA wire 402 is driven from high to low while the SCL wire remains high. The master device then transmits a clock signal on the SCL wire 404. The seven-bit address 410 of a slave device is then transmitted on the SDA wire 402. The seven-bit address 410 is followed by a Write/Read command bit 412, which indicates "Write" when low and "Read" when high. The slave device may respond in the next clock interval 414 with an ACK by driving the SDA wire 402 low. If the slave device does not respond, the SDA wire 402 is pulled high and the master device treats the lack of response as a NACK. The master device may terminate the transaction with a stop condition 408 by driving the SDA wire 402 from low to high while the SCL wire 404 is high. This transaction can be used to determine whether a slave device with the transmitted address coupled to the serial bus is in an active state.

Figure 5:
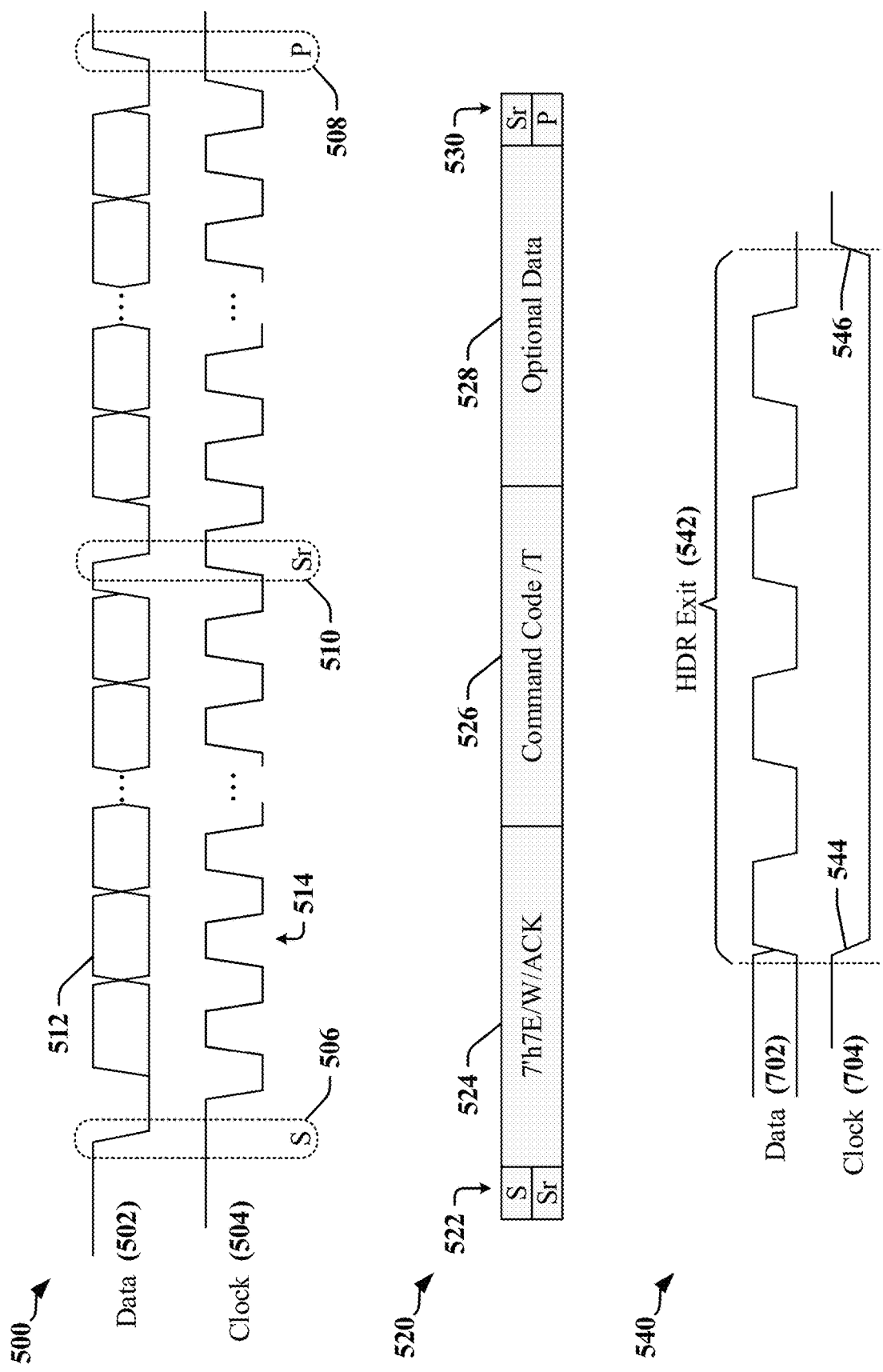
FIG. 5 includes illustrates an example of signaling on a serial bus when the serial bus is operated in a mode of operation defined by I3C specifications.

FIG. 5 illustrates signaling 500 on a serial bus when the serial bus is operated in a single data rate (SDR) mode of operation defined by I3C specifications. Data transmitted on a first wire of the serial bus, which may be referred to as the Data wire 502, SDA or SDATA, may be captured using a clock signal transmitted on a second wire of the serial bus, which may be referred to as the Clock wire 504, SCL or SCLOCK. During data transmission, the signaling state 512 of the Data wire 502 is expected to remain constant for the duration of the pulses 514 when the Clock wire 504 is at a high voltage level. Transitions on the Data wire 502 when the Clock wire 504 is at the high voltage level indicate a START condition 506, a STOP condition 508 or a Repeated Start 510.

On an I3C serial bus, a START condition 506 is defined to permit the current bus master to signal that data is to be transmitted. The START condition 506 occurs when the Data wire 502 transitions from high to low while the Clock wire 504 is high. The bus master may signal completion and/or termination of a transmission using a STOP condition 508. The STOP condition 508 is indicated when the Data wire 502 transitions from low to high while the Clock wire 504 is high. A Repeated Start 510 may be transmitted by a bus master that wishes to initiate a second transmission upon completion of a first transmission. The Repeated Start 510 is transmitted instead of a STOP condition 508, and has the significance of a STOP condition 508 followed immediately by a START condition 506. The Repeated Start 510 occurs when the Data wire 502 transitions from high to low while the Clock wire 504 is high.

The bus master may transmit an initiator 522 that may be a START condition 506 or a Repeated Start 510 prior to transmitting an address of a slave, a command, and/or data. FIG. 5 illustrates a command code transmission 520 by the bus master. The initiator 522 may be followed in transmission by a predefined address header 524 and a command code 526. The command code 526 may, for example, cause the serial bus to transition to a desired mode of operation. In some instances, data 528 may be transmitted. The command code transmission 520 may be followed by a terminator 530 that may be a STOP condition 508 or a Repeated Start 510.

Certain serial bus interfaces support signaling schemes that provide higher data rates. In one example, I3C specifications define multiple HDR modes, including the HDR-DDR mode in which data is transferred at both the rising edge and the falling edge of the clock signal.

An I3C bus may be switched between SDR and DDR modes. FIG. 5 includes an example of signaling 540 transmitted on the Data wire 502 and the Clock wire 504 to initiate certain mode changes. The signaling 540 is defined by I3C protocols for use in initiating restart, exit and/or break from I3C HDR modes of communication. The signaling 540 includes an HDR Exit 542 that may be used to cause an HDR break or exit. The HDR Exit 542 commences with a falling edge 544 on the Clock wire 504 and ends with a rising edge 546 on the Clock wire 504. While the Clock wire 504 is in a low signaling state, four pulses are transmitted on the Data wire 502. I2C devices ignore the Data wire 502 when no pulses are provided on the Clock wire 504.

Figure 6:
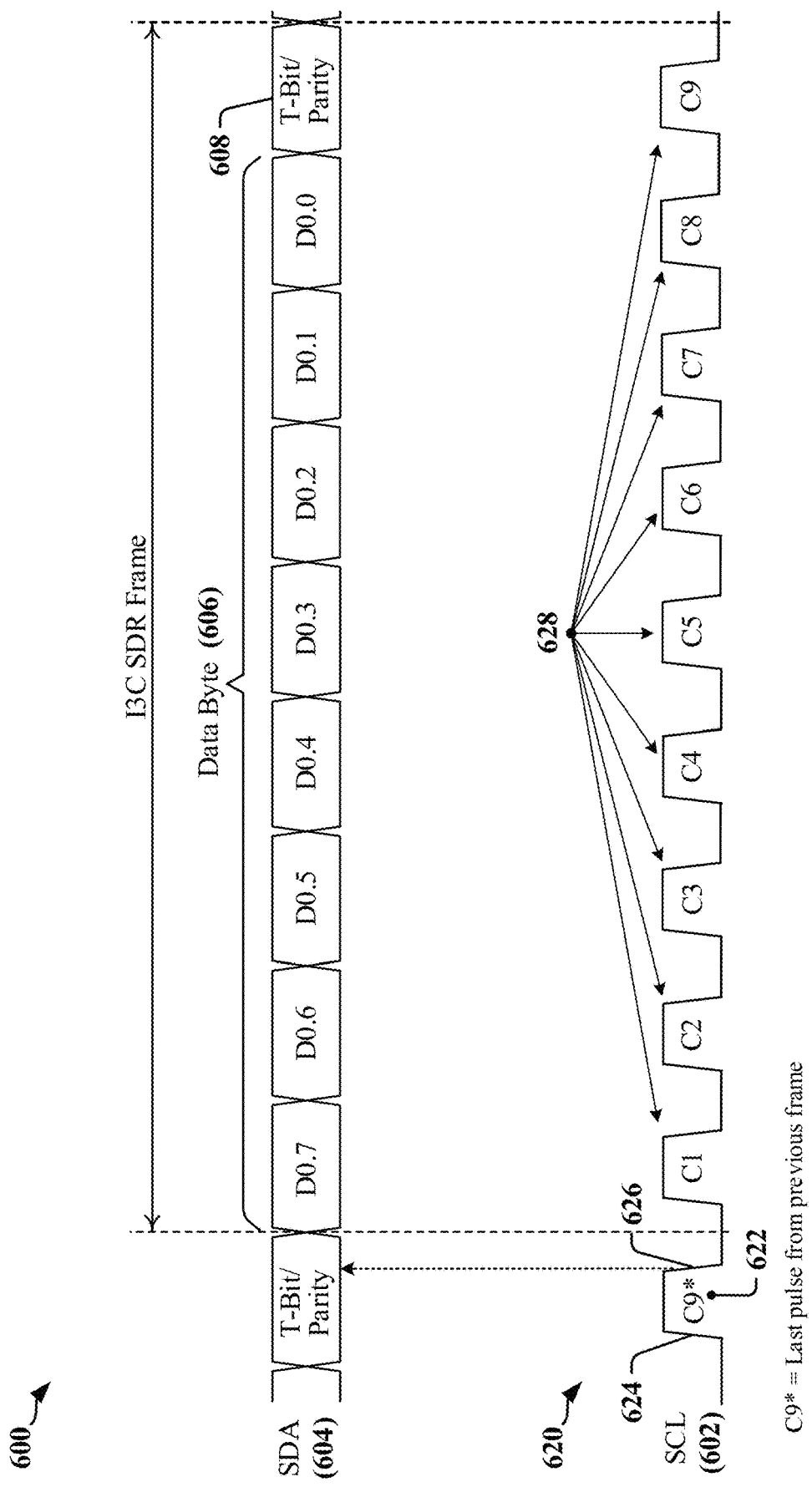
FIG. 6 illustrates an example of a transmission of a frame in an I3C single data rate mode.
Figure 7:
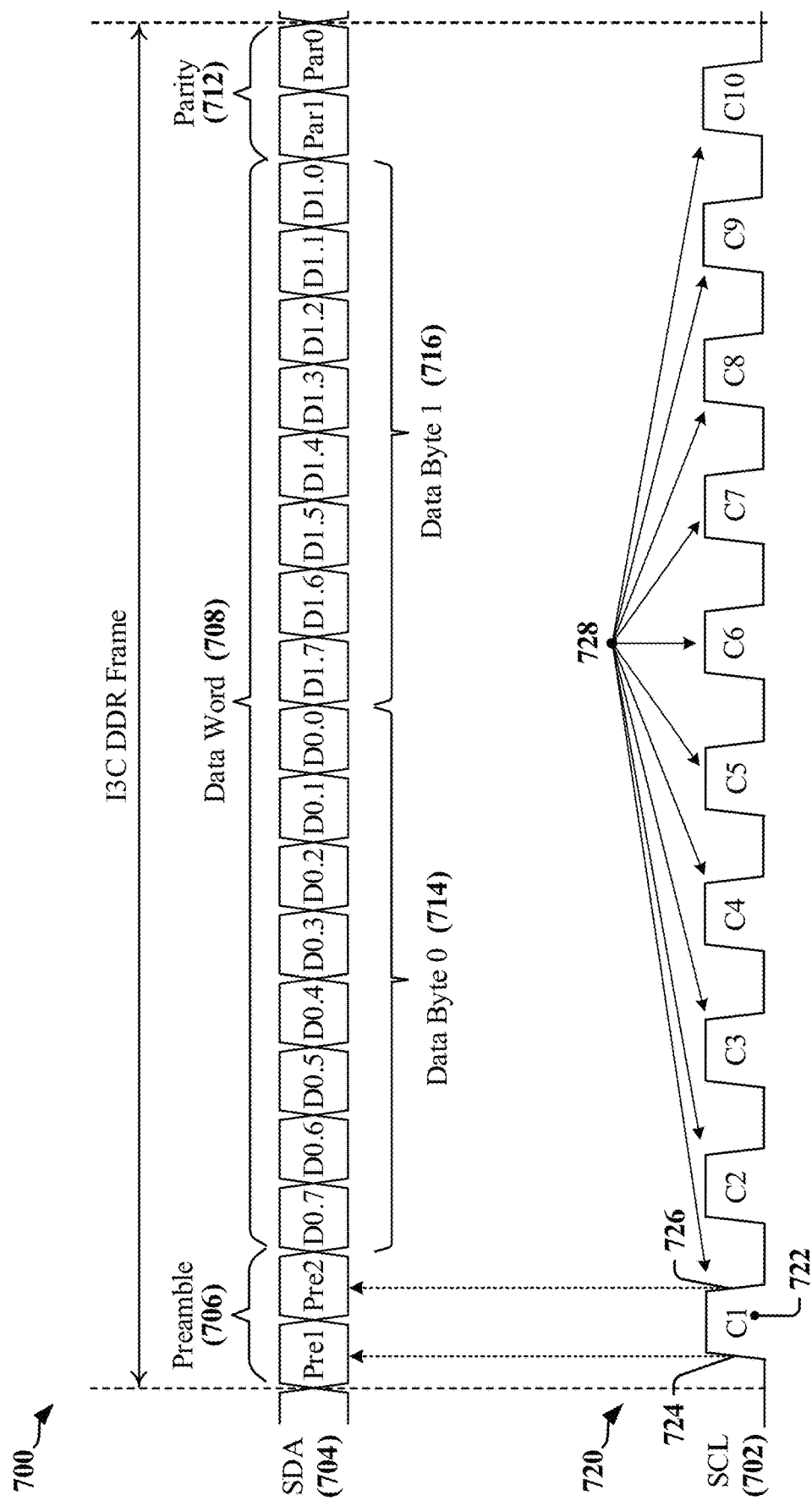
FIG. 7 illustrates an example of a transmission of a frame in an I3C high data rate mode, where data is transmitted at double data rate (DDR).

FIGS. 6 and 7 include timing diagrams that illustrate frames 600, 700 transmitted on a serial bus when a bus master device is reading from a slave device. The serial bus has a clock wire (SCL 602, 702) and a Data wire (SDA 604, 704). A clock signal 620, 720 transmitted on SCL 602, 702 provides timing information that can be used when the serial bus is operated in an I3C single data rate (SDR) mode and in an I3C HDR-DDR mode. The clock signal includes pulses 622, 628, 722, 728 that are defined by a rising edge 624, 724 and a falling edge 626, 726. A bus master device transmits the clock signal on the SCL 602, 702 regardless of the direction of flow of data over the serial bus.

FIG. 6 illustrates a frame 600 transmitted while the serial bus is operated in the I3C SDR mode. A single byte of data 606 is transmitted in each frame 600. The data signal transmitted on SDA 604 is expected to be stable for the duration of the high state of the pulses 628 in the clock signal 620 and, in one example, the state of SDA 604 is sampled on the falling edges of the clock pulses 628. Each byte of data 606 is followed by a bit 608 that can serve as a parity bit or a transition bit (T-Bit).

FIG. 7 illustrates a frame 700 transmitted while the serial bus is operated in the HDR-DDR mode. In the HDR-DDR mode, data is transferred at both the rising edge 724 and the falling edge 726 of a pulse 722 in the clock signal 720. A receiver samples or captures one bit of data on SDA 704 at each edge of the pulses 728 in the clock signal 720. A 2-byte data word 708 is transmitted in each frame 700 in the HDR-DDR mode. A data word 708 generally includes 16 payload bits, organized as two 8-bit bytes 714, 716 and the data word 708 is preceded by a two-bit preamble 706 and followed by two parity bits 712. The 20 bits in the frame 700 can be transferred on the edges of 10 clock pulses. The integrity of the transmission may be protected by the transmission of the parity bits 712.

The flexibility, bus management features and energy efficiency of the MIPI I3C Interface has elevated I3C protocols to a preferred status for serial interfaces. A conventional I3C Interface can provide effective data throughputs up to 100 Mbps. The I3C interface is used in various and different types of applications. Demand for increased data transfer rates and lower latency continues to increase for certain applications. Of course, higher data throughput could be achieved through increased bus clock rates. Increasing the bus clock rate may render slower-switching drivers in certain conventional devices unusable and can jeopardized timing closure conditions in newer receivers. In one example, timing closure conditions are met when a receiver can sample a data signal within a window of time in which the data signal is stable and valid. Some systems use multi-lane configurations that preserve the base clock rate at 12.5 MHz to ensure that timing closure conditions are met at the receiver and to maintain compatibility with older, slower devices. These multi-lane configurations achieve higher data throughput through the use of additional physical lanes and multi-lane (ML) protocols.

Additional physical lanes may be provided in a serial bus to couple two or more devices and may be used as additional data lanes to increase data throughput, provide error detection protection features, improve signal integrity, extend physical range of the serial bus, and/or for other purposes. The additional lanes can be configured to enable efficient encoding of data to be transmitted over the serial bus. I3C standards support multiple high data-rate (HDR) protocols, including DDR mode and phase-differential signaling modes. Phase-differential signaling modes encode data in symbols that control signaling state of multiple wires of the serial bus. Phase-differential signaling provides certain advantages with respect to clock-line based protocols. For example, phase-differential signaling can minimize the number of transitions on the lanes of the serial bus, and the use of common drivers for the data may improve signal integrity and support increased reach of the bus. Conventional I3C specifications provide a Ternary Symbol Legacy Mode (HDR-TSL) that is usable on a serial bus that couples legacy I2C devices, and Ternary Symbol for Pure Bus Mode (HDR-TSP) that is usable on a serial bus that couples only I3C devices.

Figure 8:
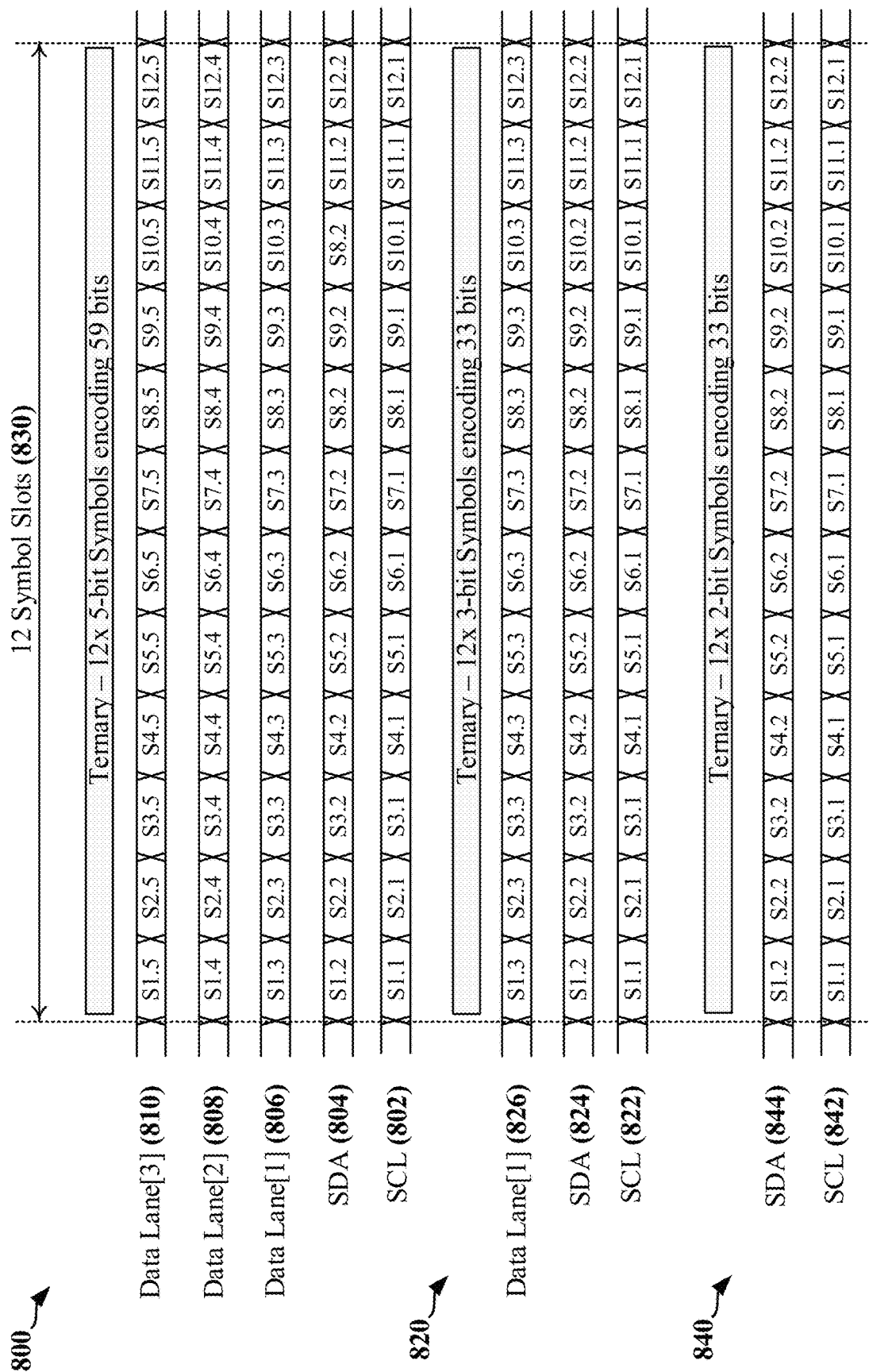
FIG. 8 illustrates transmissions over a multiline serial bus configured in accordance with certain aspects disclosed herein.

FIG. 8 illustrates three examples 800, 820, 840 of transmissions over a multi-wire serial bus. The first example 800 relates to a serial bus that has two primary wires (SCL 802 and SDA 804) and three secondary wires 806, 808, 810. The serial bus may be operated in accordance with an I3C HDR-TSP, or HDR-TSL mode in which data is encoded in 5-bit symbols and transmitted using phase-differential signaling. The second example 820 relates to a serial bus that has two primary wires (SCL 822 and SDA 824) and a secondary wire 826. The serial bus may be operated in accordance with an I3C HDR-TSP, or HDR-TSL mode in which data is encoded in 3-bit symbols and transmitted using phase-differential signaling. The third example 840 relates to a serial bus that has two primary wires (SCL 842 and SDA 844) and no secondary wires. The serial bus may be operated in accordance with an I3C HDR-TSP, or HDR-TSL mode in which data is encoded in 2-bit symbols and transmitted using phase-differential signaling.

Other combinations of wires and encoding may be provided in accordance with certain aspects disclosed herein. A command may be transmitted in HDR-DDR mode to select HDR-TSP or HDR-TSL modes. In some instances, the command may carry additional parameters that define a mode of operation for the serial bus. The mode of operation may define the number of symbols transmitted in a frame, the number of wires used to transmit symbols, the type or mode of operation of drivers and/or receivers coupled to the serial bus, encoding scheme or mapping, numerical base used to represent transition numbers, and/or other characteristics or parameters. The number of symbols transmitted in each frame or sequence of symbols may be selected to provide a desired encoding rate representing the number of data bits per frame, a desired encoding efficiency that may be expressed as the ratio of the number bits encoded per frame to the maximum number of bits that can be encoded per frame and/or to obtain a satisfactory trade-off between encoding rate and encoding efficiency.

Figure 9:
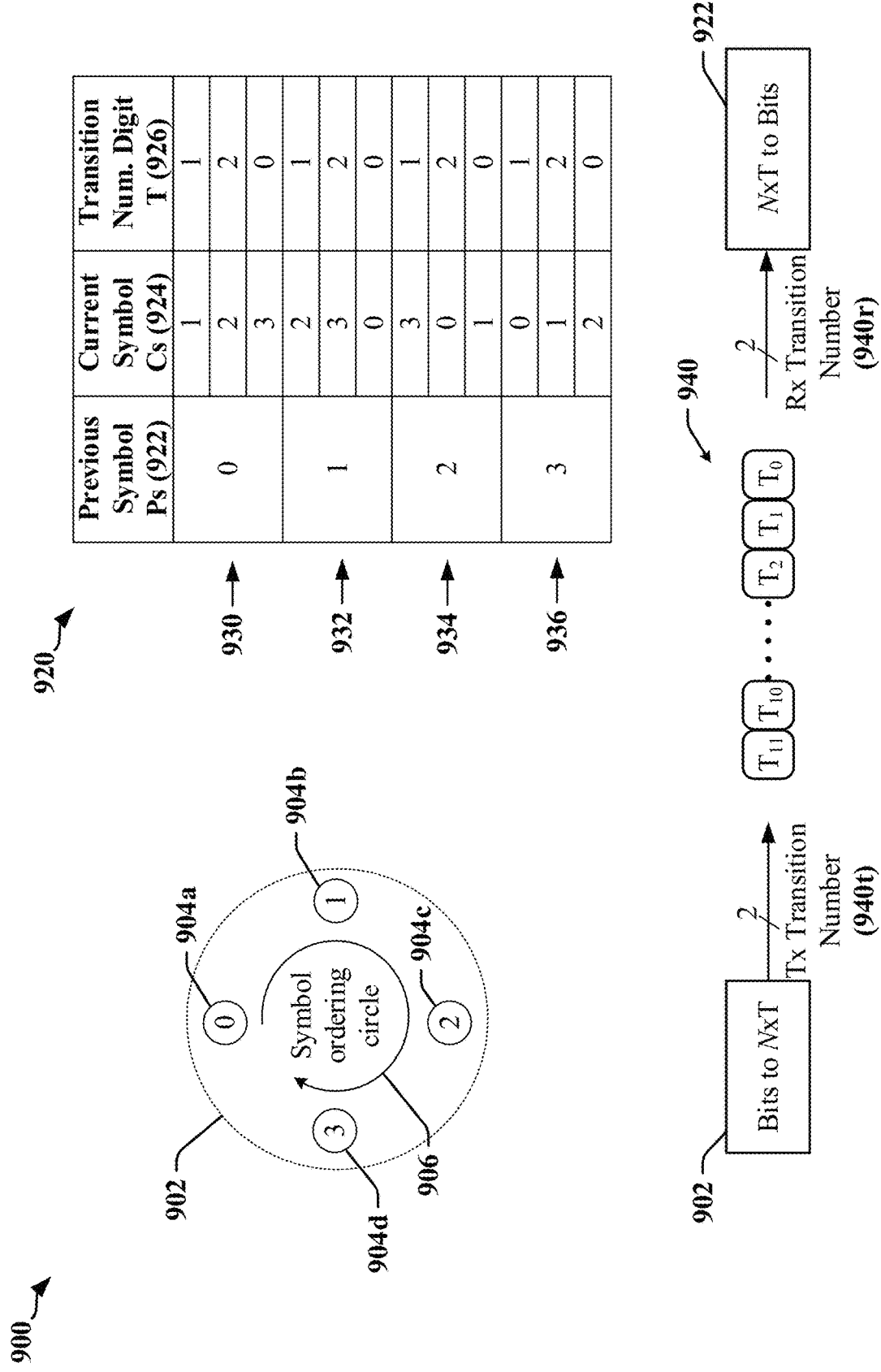
FIG. 9 illustrates a first example of an encoding scheme for transcoding data according to certain aspects disclosed herein.

FIG. 9 is a illustrates a first example of an encoding scheme 900 that may be used by a ternary-to-symbols encoder to produce a sequence of symbols with an embedded clock for transmission on the serial bus 320. The encoding scheme 900 may also be used by a symbols-to-ternary decoder to extract ternary transition numbers from symbols received from the serial bus 3230. In this encoding scheme 900, the two wires of the serial bus 320 permit definition of 4 basic symbols 930, 932, 934, 936 (S: {0, 1, 2, 3}). Any two consecutive symbols in the sequence of symbols have different states, and the symbol sequences 0,0, 1,1, 2,2 and 3,3 are invalid combinations of consecutive symbols. Accordingly, only 3 valid symbol transitions are available at each symbol boundary, where the symbol boundary is determined by the transmit clock and represents the point at which a first symbol (previous symbol Ps) 922 terminates and a second symbol (current symbol Cs) 924 begins.

According to certain aspects disclosed herein, the three available transitions are assigned a transition number digit (T) 926 for each Ps symbol 922. The value of T 926 can be represented by a ternary number. In one example, the value of a transition number digit 926 may be determined by assigning a symbol-ordering circle 902 for the encoding scheme. The symbol-ordering circle 902 allocates locations 904a-904d on the symbol-ordering circle 902 for the four possible symbols, and a direction of rotation 906 between the locations 904a-904d. In the depicted example, the direction of rotation 906 is clockwise. The transition number digit 926 may represent the separation between the valid current symbols 924 and the immediately preceding symbol 922. Separation may be defined as the number of steps along the direction of rotation 906 on the symbol-ordering circle 902 required to reach the current symbol Cs 924 from the previous symbol 922. The number of steps can be expressed as a single digit base-3 number. It will be appreciated that a three-step difference between symbols can be represented as a $0_{base-3}$. The table 920 in FIG. 9 summarizes an encoding scheme employing this approach.

At the transmitter, the table 920 may be used to lookup a current symbol 924 to be transmitted, given knowledge of the previously generated symbol 922 and an input ternary number, which is used as a transition number digit 926. At the receiver, the table 920 may be used as a lookup to determine a transition number digit 926 that represents the transition between the previously received symbol 922 and the currently received symbol 924.

According to certain aspects, a transition number 940 may be formed from a plurality of transition number digits 926, each digit 926 being usable to determine a next symbol given a current symbol. In one example, the transition number 940 is a ternary number that includes 12 ternary digits 926. In the general case, a transition number 940 having N digits (Ts) 926 with r possible transitions for each T 926 has a total of $r^N$ states. In the example of a 12-digit transition number 940, there are a total of r=4−1=3 possible transitions for each of the N=12 digits 926, providing a total of $3^{12}$=531441 different states. Consequently, the 12-digit transition number 940 can encode 19-bit binary numbers which require 524288 states. The remaining 7153 states may be used to carry control codes, or the like.

A plurality of next-generation devices may coexist on the same serial bus 320 with one or more legacy I2C devices. Accordingly, the high data rate protocol defines signaling schemes that can be ignored, undetected or otherwise disregarded by legacy I2C devices. The I3C devices may transmit control information in signaling that is consistent with I2C mode signaling, and may transmit the data payload encoded according to ternary coding-based protocols to obtain faster transmission speeds. The next-generation devices may use other encoding modes for transmitting the data payload, including legacy I2C modes.

Figure 10:
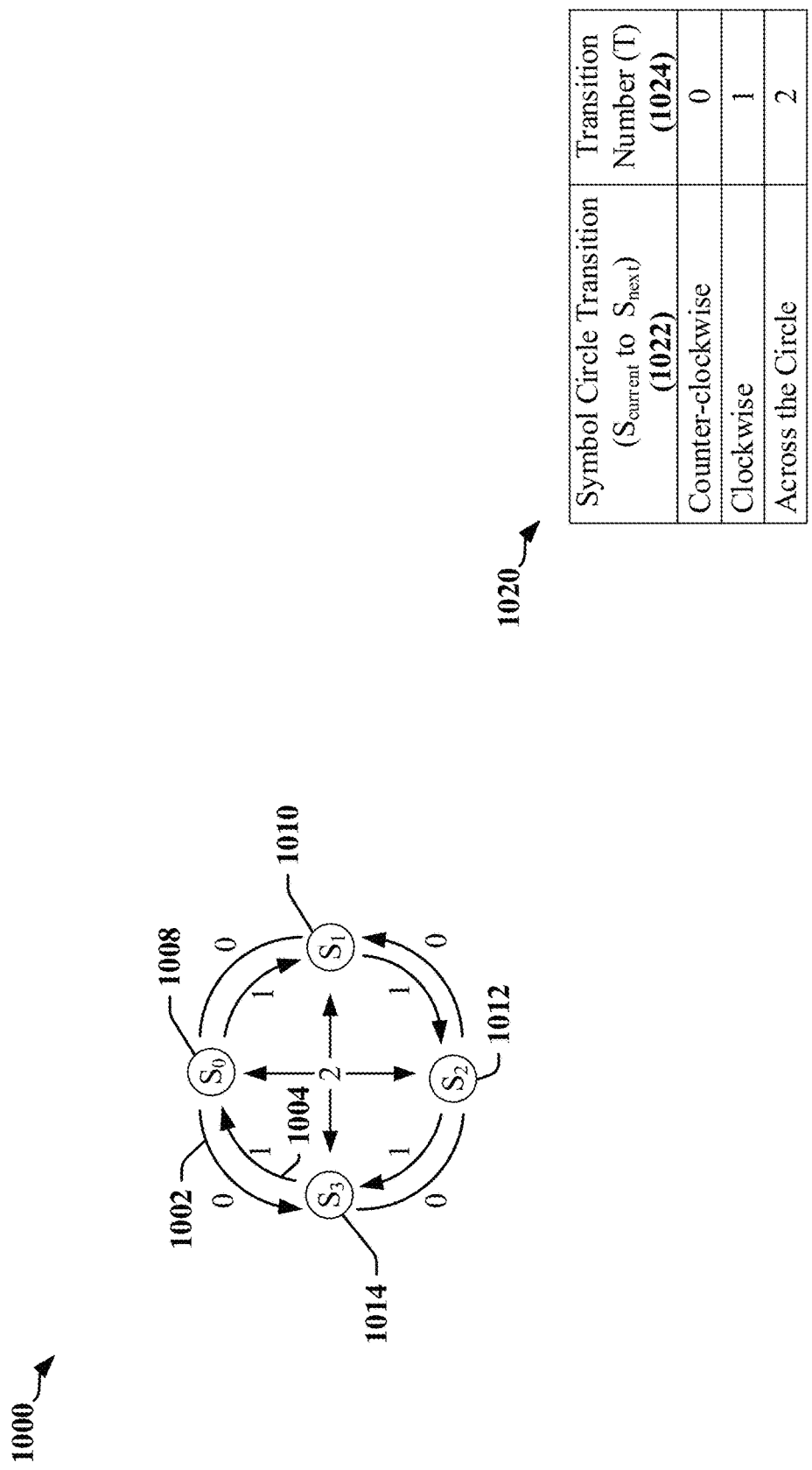
FIG. 10 illustrates a second example of an encoding scheme for transcoding data according to certain aspects disclosed herein.

FIG. 10 illustrates a second example of an encoding scheme 1000 employing symbol transition encoding on a two-wire serial bus 320. In this example, a variation of ternary-based number coding is employed in accordance with I3C HDR protocols. It is contemplated that certain concepts associated with symbol transitioning may be expanded to include an I3C serial bus 320 that has three or more wires. Septenary-based number coding may be used when three wires are available for transmitting symbols, pentadecimal-based number coding may be used when four wires are available for transmitting symbols, and so on. In the two-wire example represented in the table 1020 (see also FIGS. 7-9), the transition numbers 1024 generated by an encoder may be represented as a displacement value 1022 between states 1008, 1010, 1012, 1014 on and across a circle. A clockwise displacement 1004 may be represented as a ternary value T=1, a counter-clockwise displacement 1002 may be represented as a ternary value T=0, and a displacement across the circle (i.e., 2 steps clockwise or counterclockwise) may be represented as a ternary value T=2.

Other symbol encoding schemes may be implemented for two wire implementations and/or for implementations using more than two wires. In one example for N wires (W1 . . . WN), where N≥3, for three or more wires, encoding may be characterized by the transition number formula:

$$\{(W1_S \text{ XNOR } W1_{S-1}), (W2_S \text{ XNOR } W2_{S-1}), \ldots (WN_S \text{ XNOR } WN_{S-1})\},$$

for two consecutive states S and S−1.

Figure 11:
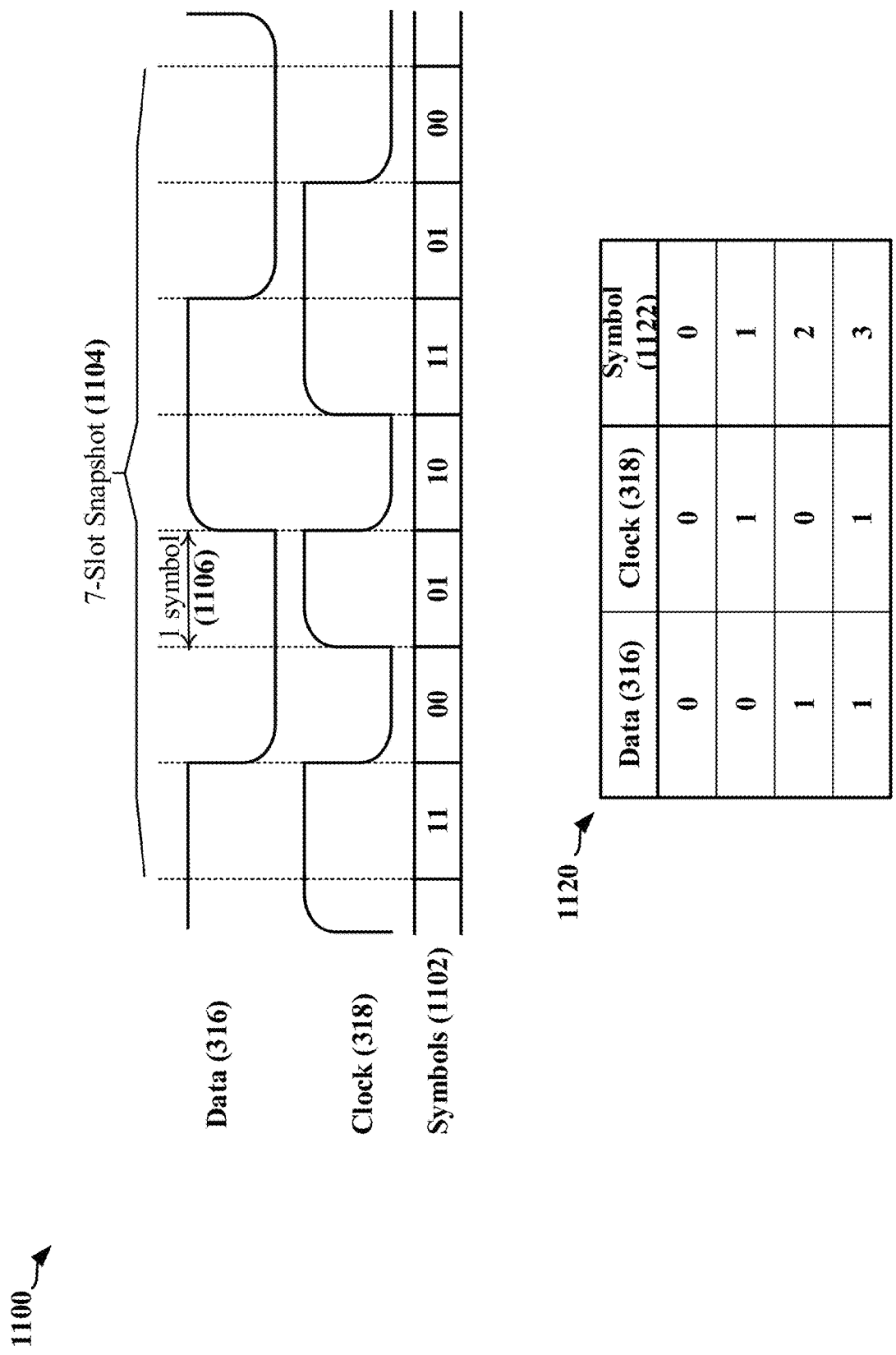
FIG. 11 illustrates the signaling state of a high data rate protocol, such as an I3C protocol, when transmitting symbols according to certain aspects disclosed herein.

FIG. 11 includes a timing diagram 1100 illustrating the signaling state of the serial bus 320 when transmitting a sequence of symbols according to certain aspects disclosed herein. In the example depicted, both the Clock line 318 and Data line 316 are used to encode data. Raw symbol values 1102 cause line driving circuits to drive each of the Clock line 318 and Data line 316 to voltage levels determined by one bit of the current raw symbol value 1102. In the example, a symbol bit that is set to "binary 1" causes a corresponding one of the Clock line 318 and Data line 316 to a more positive voltage level, while a symbol bit that is set to "binary 0" causes a corresponding one of the Clock line 318 and Data line 316 to a more negative voltage level. FIG. 11 provides a table 1120 showing the four possible signaling states for symbols 1122 when each of the Clock line 318 and Data line 316 can be at one of two voltage levels. A data element having K bits may be encoded in a sequence of L symbols. The values of K and L may be determined based on encoding scheme, word size and configuration and other application parameters, including latency, etc. The timing diagram 1100 illustrates an extract or snapshot of a symbol transmission sequence that includes 7 slots 1104, where a symbol 1106 may be transmitted in each of the slots 1104. The 7 slots illustrated may be part of a larger symbol sequence such as a 12-symbol sequence that encodes a 16-bit word, or may include two or more sequences of symbols (e.g., 2, 3 . . . or 6 symbol examples, for example).

According to certain aspects disclosed herein, a transmitter may be configured or adapted to ensure that the same symbol is not transmitted in any two consecutive slots in a sequence of slots 1104. Accordingly, at least one of the Clock line 318 and Data line 316 changes signaling state at each boundary between consecutive symbols. The toggling of either of the Clock line 318 and Data line 316 marks the beginning of a new symbol.

According to certain aspects, signaling on the primary wires may be configured to avoid generation of certain data patterns defined by I3C HDR for indicating Restart, Exit, and/or in-band Reset. In some instances, the primary wires carry data in a mode prescribed by convention I3C protocols, including data transmitted using SDR, HDR-DDR, HDR-TSP and HDR-TSL protocols.

Error Signaling Windows for Phase-Differential Protocols

The data throughput and latency requirements defined by certain applications may necessitate an increase in the base clock rate for a serial bus. Increases in the base clock rate present particular difficulties with respect to timing closure for communication based on protocols such as the I3C SDR and I3C HDR-DDR protocols, which use a dedicated clock wire (SCL) that is driven by the bus master regardless of direction of data transmission. In a READ transaction, timing windows open as an edge in the clock signal is introduced at the bus master, the clock signal traverses the serial bus to a slave device that used the edge to time transmission of data in the opposite direction over the serial bus. In the latter example, transmission and switching delays accumulate and have maximum effect on the timing window at the receiver circuits in the bus master.

Phase-differential protocols such as the I3C HDR-TSP and I3C HDR-TSL protocols can overcome certain of the timing closure issues that can affect I3C SDR and I3C HDR-DDR due to the use of an embedded clock in each transmission. The clock is embedded by the transmitter and provides timing information in symbol transitions that can be used by a receiver to control the timing of symbol capture. That is to say, the clock information originates at the same end of the serial bus as the transmitted data and a closely-matched propagation path can easily be provided for all wires, including all wires in multi-lane serial buses.

Certain aspects of this disclosure provide techniques for detecting errors that can occur when phase-differential protocols are used. These techniques can improve serial bus performance when higher clock rates are used to control transmissions over the serial bus. While certain techniques, apparatus and procedures are described using the example of I3C HDR-TSP and I3C HDR-TSL protocols, the underlying concepts and the I3C HDR-TSP and I3C HDR-TSL protocols are applicable to other phase-differential protocols.

Frame synchronization can be problematic in high-data rate or noisy bus environments that employ phase-differential protocols. The I3C HDR-TSP and I3C HDR-TSL protocols define data packets that are encoded in frames of 12 symbols. Data is encoded in the transitions between symbols and the loss of a symbol due to noise or sampling circuit error can affect decoding based on multiple subsequent symbol transitions. The I3C protocols provide a parity check that can be used to trigger a request for early termination, which can be signaled during one or more early termination signaling patterns. The early termination signaling patterns may contribute to bus errors or be confused with normal data transfer symbols due to a loss of synchronization when, for example, a timing error causes the receiver to miss or drop a symbol. In some instances, a receiver that detects a parity error may attempt to signal the sender using protocol-defined patterns and may cause a serious, destructive bus collision when synchronization has been lost. For example, the sender may be transmitting a next frame having received no early termination signaling. An out-of-synchronization receiver attempting to transmit an error code at a point between frames defined by protocol may cause a bus collision with the sender.

Certain aspects of this disclosure provide signaling that can allow devices to reliably identify an error signaling window. The term "error signaling window" may be used to characterize patterns of signaling that permit a receiving device in the transaction to indicate an error. An error signaling window indicator may be provided that uses predefined, unique patterns within the data stream that can be unequivocally identified by a sending device in a transaction and serve as an indication of an error detected by a receiving device in the transaction. In one example, an error signaling window may be indicated using a data string of symbols that is prohibited or that does not appear in any other valid data transfer. In another example, an error signaling window may be indicated using an early termination pattern defined by protocol and modified to alter one or more timing parameters associated with the early termination pattern.

According to certain aspects of the disclosure, the patterns, timing and characteristics associated with an error signaling window used with one or more phase-differential protocols may be defined by protocol or configured using command transmissions or negotiated between sender and receiver. All wires of a serial bus that operates according to a phase-differential protocol are actively driven during data transfer transactions. The receiver in the transaction can signal an error or request an action only at times agreed between the transmitter and receiver, or at times configured for both the transmitter and the receiver a priori, and provided certain specific procedures defined for the signaling. Definition of the timing and structure of the error signaling window is necessary to prevent collisions and to ensure that synchronization can be reestablished after occurrence of an error.

In one example, a common command code (CCC) may be used to configure certain aspects of an error signaling window used with an I3C HDR-TSP or I3C HDR-TSL protocol. In another example, applications on the sender and receiver may establish a contract governing the use and format of an error signaling window. The operation and configuration of error signaling windows may be defined during system design, initialization or during bus instantiation of affected devices. A multi-lane serial bus implementation of a phase-differential protocol may provide error signaling windows using primary lanes (e.g. SCL and SDA), using additional lanes, or using some combination of primary and additional lanes.

Error signaling windows can be used in data transfer to and from a bus master or between slave devices. The timing related to error signaling windows can be modified by application in order to achieve robust error identification and ensure that serial can operate reliably when timing closure approaches its specified limits. In the example of I3C protocols, certain the HDR-TSP and HDR-TSL specification define flow-control procedures that can be adapted to enable a receiver to safely intervene when an error is detected. These procedures can be adapted for use with other phase-differential or symbol-based protocols. Certain of these procedures and adaptations are described with reference to a 2-line serial bus although the concepts and certain implementations are applicable to serial buses that have one or more additional lines.

Figure 12:
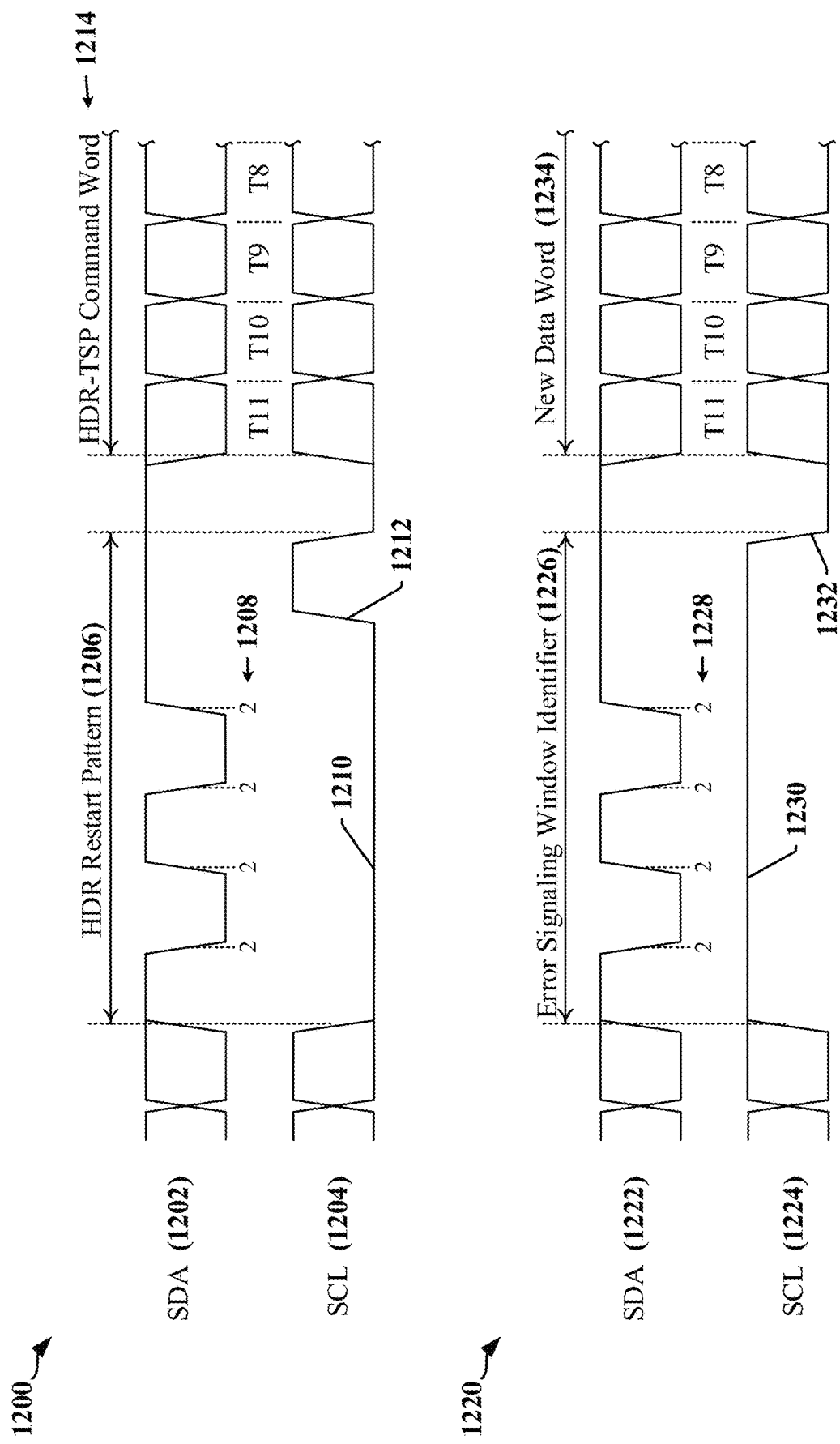
FIG. 12 illustrates a first example of a signaling adaptation used to provide an error signaling window in accordance with certain aspects disclosed herein.

FIG. 12 illustrates a first adaptation of signaling 1200 defined by I3C HDR-TSP and I3C HDR-TSL protocols in accordance with certain aspects disclosed herein. An HDR Restart pattern 1206 is recognizable in all I3C modes of operation, including SDR, HDR-DDR, HDR-TSP and HDR-TSL modes. The HDR Restart pattern 1206 corresponds to transmission of a sequence of symbols that include three or more consecutive symbols 1208 with a value of '2'. The sequence of symbols causes SCL 1204 to be held in a low signaling state 1210 while SDA 1202 toggles. An edge 1212 on SCL 1204 validates the restart and may trigger a receiver to capture current state of SDA 1202 and SCL 1204 to reset or configure receiving circuits prior to the appearance of a next command word 1214 on the serial bus.

In one aspect of the disclosure, the HDR Restart pattern 1206 may be adapted to provide an error signaling window identifier 1226 in signaling 1220 transmitted over the serial bus. The error signaling window identifier 1226 is also recognizable in all I3C modes of operation, including the SDR, HDR-DDR, HDR-TSP and HDR-TSL modes. The error signaling window identifier 1226 corresponds to transmission of a sequence of symbols that include three or more consecutive symbols 1228 with a value of '2'. The sequence of symbols causes SCL 1224 to be held in a high signaling state 1230 while SDA 1222 toggles. An edge 1232 on SCL 1204 validates the restart and may trigger a receiver to capture current state of SDA 1222 and SCL 1224 to reset or configure receiving circuits prior to the appearance of a next data word 1234 on the serial bus.

Figure 13:
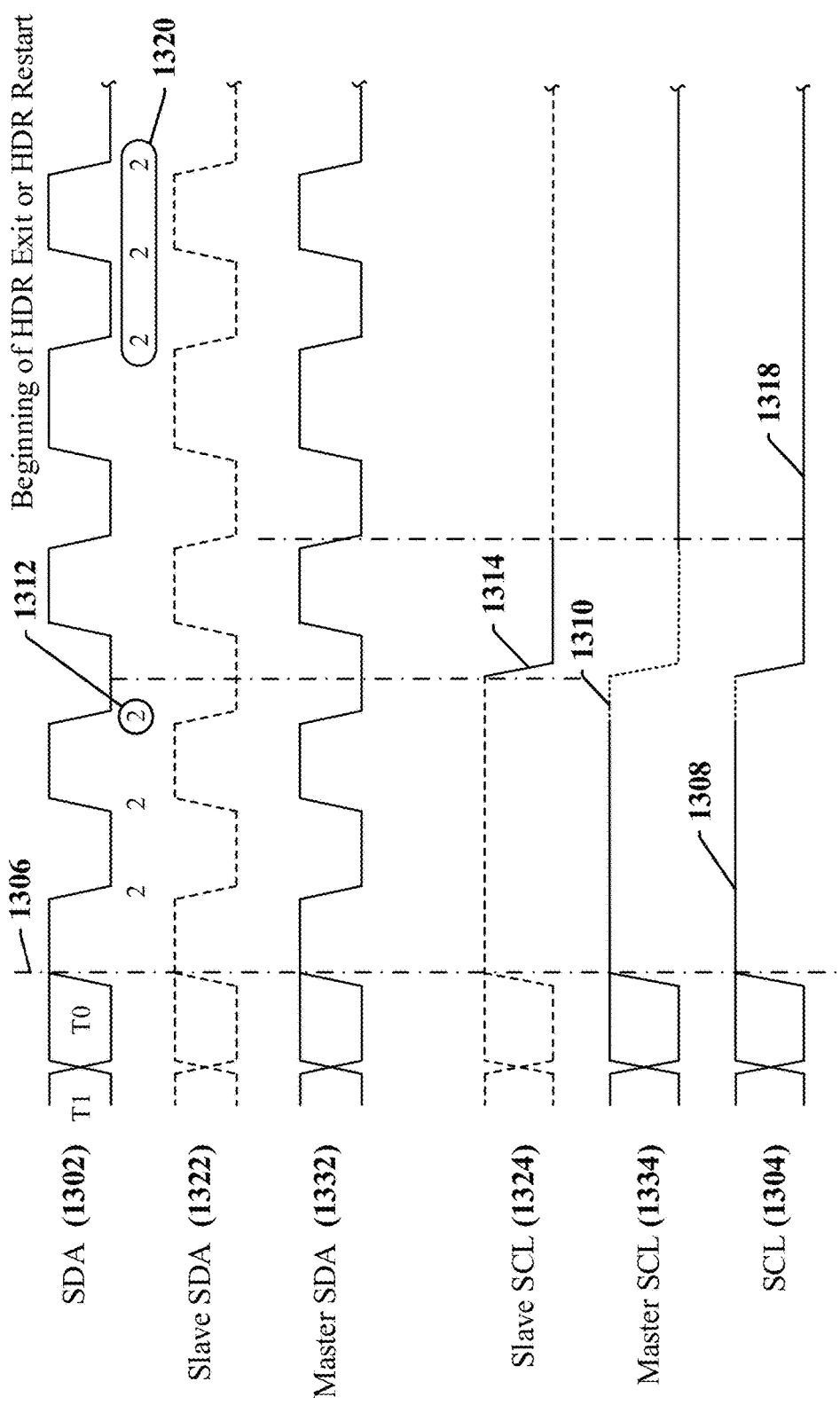
FIGS. 13-16 illustrate the use of an error signaling window provided in accordance with certain aspects disclosed herein.
Figure 14:
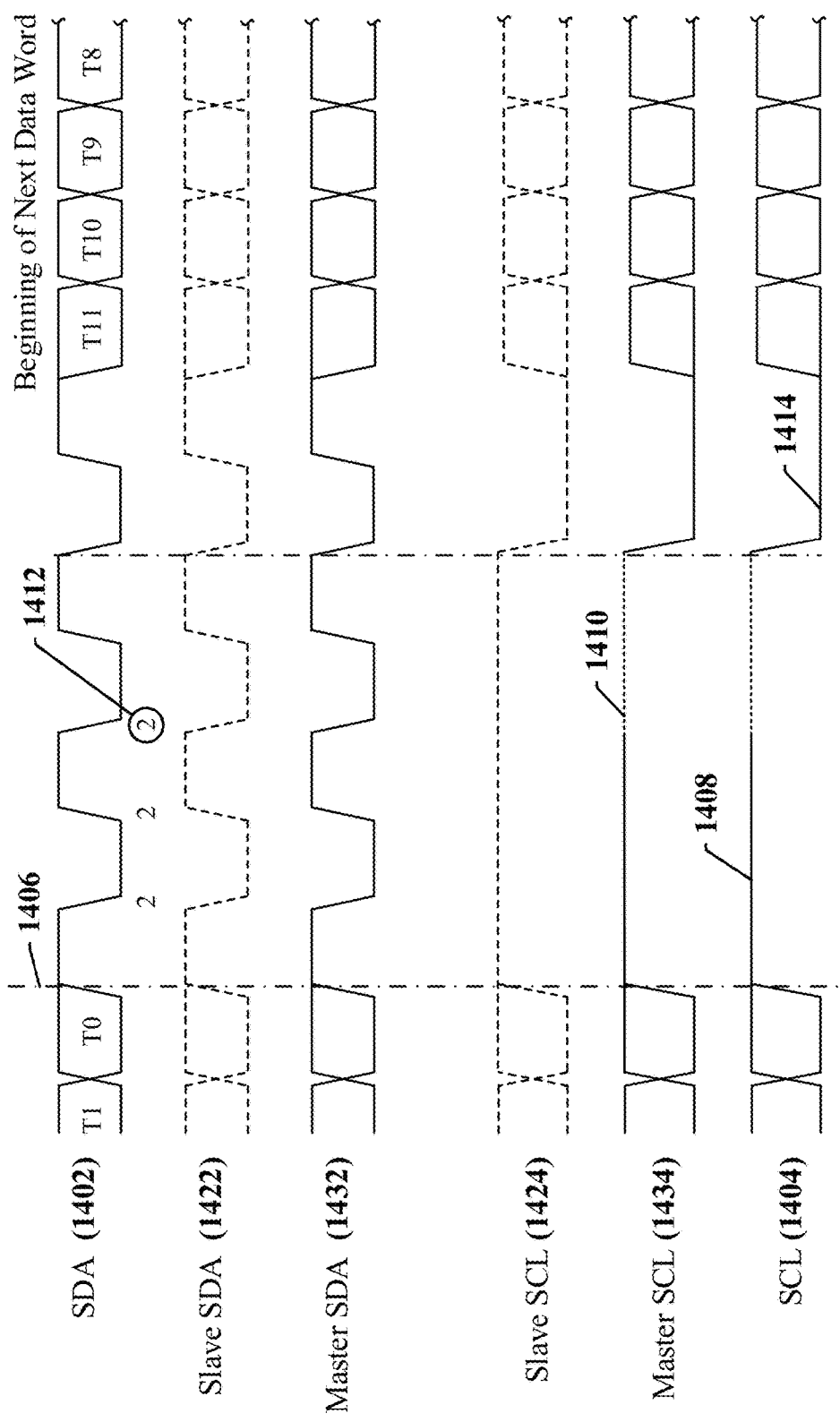

The timing diagrams 1300, 1400 in FIGS. 13 and 14, respectively, illustrate first examples of the use of an error signaling window provided in accordance with certain aspects disclosed herein. These first examples relate to master-to-slave transfers.

The timing diagrams 1300, 1400 relate to an example of a serial bus operated in accordance with an I3C HDR-TSP or I3C HDR-TSL protocol. The timing diagrams 1300, 1400 show signaling on SDA 1302, 1402 and SCL 1304, 1404. The timing diagrams 1300, 1400 show also show slave device contribution 1322, 1422 to the signaling on SDA 1302, 1402 and the bus master 1332, 1432 contribution to the signaling on SDA 1302, 1402. The timing diagrams 1300, 1400 further show slave device contribution 1324, 1424 to the signaling on SCL 1304, 1404 and the bus master contribution 1334, 1434 to the signaling on SCL 1304, 1404. Contributions to the signaling on SDA 1302, 1402 or the signaling on SCL 1304, 1404 are shown as solid lines, whereas dashed lines indicate that the driver of a corresponding device is in a high-impedance state. In some instances, the bus master may cause the output of one of its drivers coupled to a line of the serial bus to enter a high impedance state while connecting a keeper circuit or passive pullup or pulldown circuit to the output of the driver to maintain a desired or default signaling state on the line of the serial bus.

The timing diagram 1300 in FIG. 13 illustrates termination by a slave device of a master-to-slave transfer using an error signaling window provided in accordance with certain aspects disclosed herein. The bus master actively drives SDA 1302 and SCL 1304 to the high state 1308 at the time 1306 when the bus master has completed transmission of the last symbol (T0) used to encode a data word. The bus master maintains SCL 1304 high while toggling SDA 1302 at each succeeding symbol transmission interval. The combination of SCL 1304 high while SDA 1302 toggles is interpreted as a symbol with a value '2'. A sequence of three or more symbols with a value '2' is prohibited in data transmissions according to I3C phase-differential protocols, and such a sequence is recognized as an error signaling window in bus masters and slave devices configured in accordance with certain aspects of this disclosure. The error signaling window signaling may be produced by a logic circuit in the bus master.

The slave device that is a party to the transfer may include a logic circuit configured to detect the error signaling window independently of the decoding logic in the slave device. In some instances, the error signaling window may be configured to produce more than three symbols with a value '2' at the receiver such that the receiver can recognize the error signaling window when one or more symbols are lost or include an error. The slave device may determine that the error signaling window has been received unexpectedly. For example, a lost or dropped symbol may cause the error signaling window to be detected early. Early or late detection of the error signaling window or detection of parity errors by the slave device may be interpreted as an error condition. Other error conditions may arise, for higher level applications for example. The detection of any type of communication error may cause the slave device to terminate the transfer.

According to one aspect, the slave device may terminate the transfer after detecting or receiving the third symbol 1312 with a value '2' by driving SCL 1304 to a low signal state. The bus master may release SCL 1304 to a high impedance state 1310 after the transition corresponding to the third symbol 1312 with a value '2' is transmitted to facilitate the driving of SCL 1304 by the slave device. The bus master may couple a keeper circuit or passive pullup circuit to SCL 1304 when causing its line driver to enter a high-impedance state. The slave device causes its line driver to enter a high-impedance mode after driving SCL 1304 to the low signal state and after one or more edges in SDA 1302 that allow the bus master to detect the transition 1314 in SCL 1304.

The bus master causes its line driver to actively drive SCL 1304 to the low signal state 1318 after the bus master detects the transition 1314 in SCL 1304. The bus master may then terminate the transfer. In one example, the bus master maintains SCL 1304 in the low signal state 1318 and continues to toggle SDA 1302 to produce an HDR Exit or Restart pattern that includes an additional sequence of three or more value '2' symbols 1320.

The timing diagram 1400 in FIG. 14 illustrates a continuation indicated by a slave device in a master-to-slave transfer using an error signaling window provided in accordance with certain aspects disclosed herein. The bus master actively drives SDA 1402 and SCL 1404 to the high state 1408 at the time 1406 that the bus master has completed transmission of the last symbol (T0) used to encode a data word. The bus master maintains SCL 1404 high while toggling SDA 1402 at each succeeding symbol transmission interval. The combination of SCL 1404 high while SDA 1402 toggles is interpreted as a symbol with a value '2' and a sequence of three or more such symbols is prohibited in data transmissions I3C phase-differential protocols, and is recognized as an error signaling window in bus masters and slave devices configured in accordance with certain aspects of this disclosure. The error signaling window signaling may be produced by a logic circuit in the bus master.

The slave device that is a party to the transfer may include a logic circuit configured to detect the error signaling window independently of the decoding logic in the slave device. In some instances, the error signaling window may be configured to produce more than three symbols with a value '2' at the receiver such that the receiver can recognize the error signaling window when one or more symbols are lost or include an error. The slave device may determine that the error signaling window has been timely received and that no other type of communication error has been detected.

According to one aspect, the slave device may refrain from driving SDA 1402 and SCL 1404 when no error is detected. The bus master may release SCL 1404 to a high impedance state 1410 after the transition corresponding to the third symbol 1412 with a value '2' is transmitted to facilitate the driving of SCL 1404 if needed by the slave device. The bus master may couple a keeper circuit or passive pullup circuit to SCL 1404 when causing its line driver to enter a high-impedance state. The bus master causes its line driver to actively drive SCL 1404 to the low signal state 1414 after some period of time calculated to provide sufficient time to permit a slave device to request termination. In some examples, the bus master waits for between 1 and 8 symbol intervals to allow the slave device to request termination. In some examples, the bus master stretches one or more symbol intervals to allow the slave device to request termination.

Figure 15:
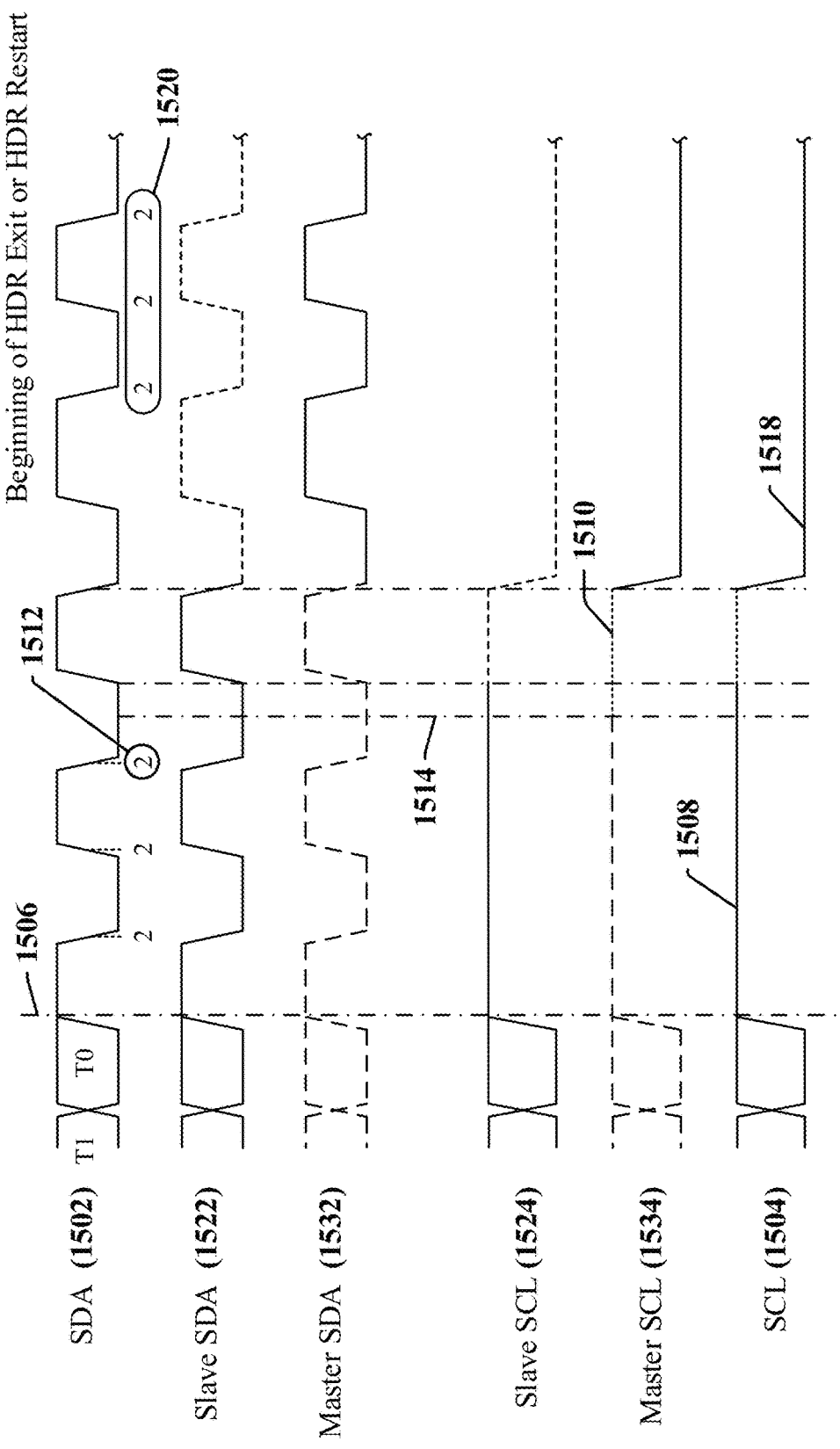
Figure 16:
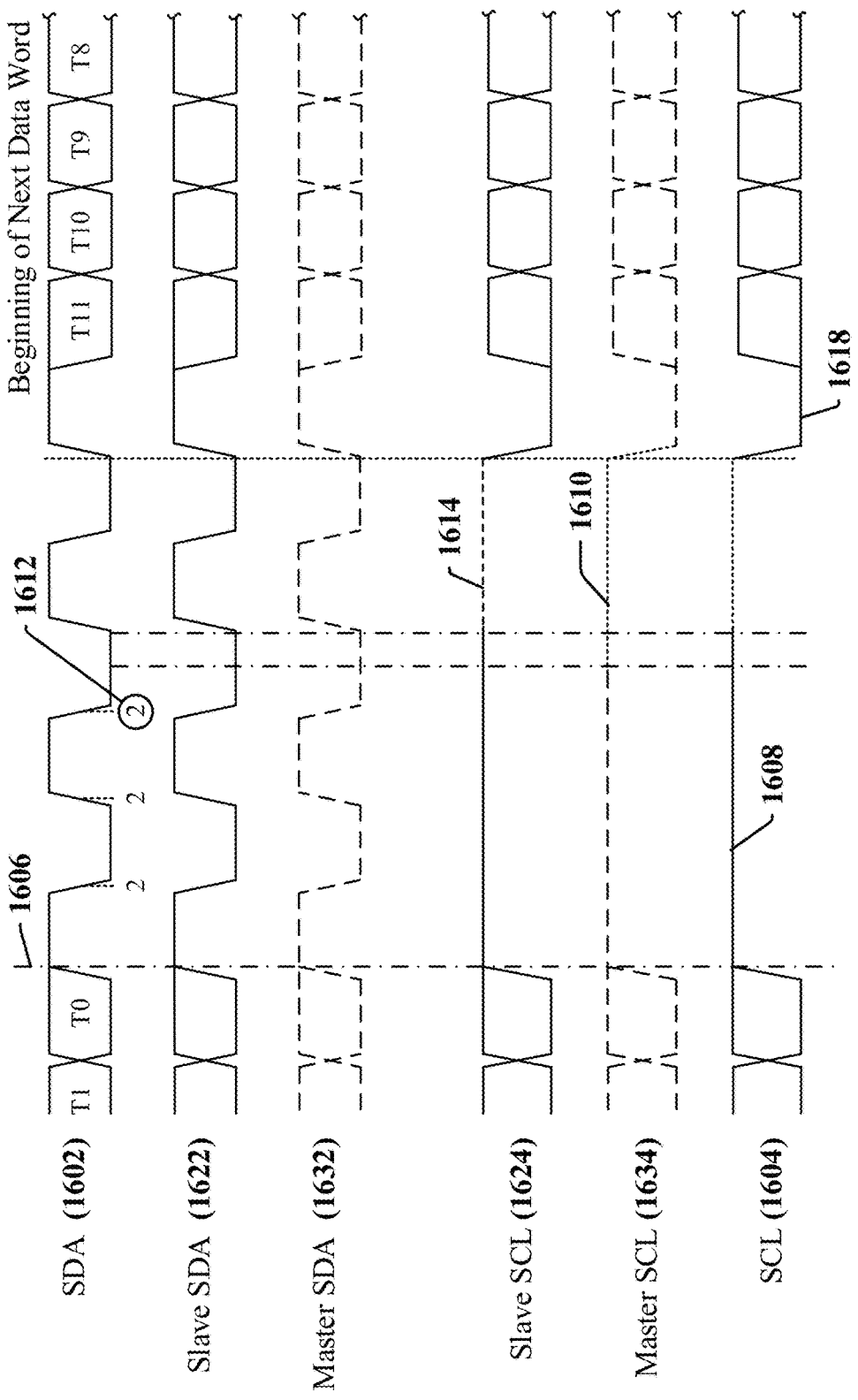

The timing diagrams 1500, 1600 in FIGS. 15 and 16, respectively, illustrate second examples of the use of an error signaling window provided in accordance with certain aspects disclosed herein. These second examples relate to slave-to-master transfers.

The timing diagrams 1500, 1600 relate to an example of a serial bus operated in accordance with an I3C HDR-TSP or I3C HDR-TSL protocol. The timing diagrams 1500, 1600 show signaling on SDA 1502, 1602 and SCL 1504, 1604. The timing diagrams 1500, 1600 show also show slave device contribution 1522, 1622 to the signaling on SDA 1502, 1602 and the bus master 1532, 1632 contribution to the signaling on SDA 1502, 1602. The timing diagrams 1500, 1600 further show slave device contribution 1524, 1624 to the signaling on SCL 1504, 1604 and the bus master contribution 1534, 1634 to the signaling on SCL 1504, 1604. Contributions to the signaling on SDA 1502, 1602 or the signaling on SCL 1504, 1604 are shown as solid lines, whereas dashed lines indicate that the driver of a corresponding device is in a high-impedance state. In some instances, the bus master may cause the output of one of its drivers coupled to a line of the serial bus to enter a high impedance state while connecting a keeper circuit or passive pullup or pulldown circuit to the output of the driver to maintain a desired or default signaling state on the line of the serial bus.

The timing diagram 1500 in FIG. 15 illustrates termination by a master device of a slave-to-master transfer using an error signaling window provided in accordance with certain aspects disclosed herein. The slave device actively drives SDA 1502 and SCL 1504 to the high state 1508 at the time 1506 that the slave device has completed transmission of the last symbol (T0) used to encode a data word. The slave device maintains SCL 1504 high while toggling SDA 1502 at each succeeding symbol transmission interval. The combination of high SCL 1504 while SDA 1502 toggles is interpreted as a symbol with a value '2' and a sequence of three or more such symbols is prohibited in data transmissions I3C phase-differential protocols, and is recognized as an error signaling window in bus masters and slave devices configured in accordance with certain aspects of this disclosure. The error signaling window signaling may be produced by a logic circuit in the slave device.

The bus master may include a logic circuit configured to detect the error signaling window independently of the decoding logic in the bus master. In some instances, the error signaling window may be configured to produce more than three symbols with a value '2' at the receiver such that the receiver can recognize the error signaling window when one or more symbols are lost or include an error. The bus master may determine that the error signaling window has been received unexpectedly. For example, a lost or dropped symbol may cause the error signaling window to be detected early. Early or late detection of the error signaling window or detection of parity errors by the slave device may be interpreted as an error condition. Other error conditions may arise, for higher level applications for example. The detection of any type of communication error may cause the bus master to terminate the transfer.

According to one aspect, the bus master may terminate the transfer after detecting or receiving the third symbol 1512 with a value '2' by driving SCL 1504 to a low signal state. The slave device may release SCL 1504 to a high impedance state 1510 after the transition corresponding to the third symbol 1512 with a value '2' is transmitted to facilitate the driving of SCL 1504 by the bus master. The bus master may couple a keeper circuit or passive pullup circuit to SCL 1504 before the slave device causes its line driver to enter the high impedance state. The bus master causes its line driver to actively drive SCL 1504 to the low signal state 1518 at the next falling edge on SDA 1502. The bus master may then terminate the transfer. In one example, the bus master maintains SCL 1504 in the low signal state and continues to toggle SDA 1502 to produce an HDR Exit or Restart pattern that includes an additional sequence of three or more value '2' symbols 1520.

The timing diagram 1600 in FIG. 16 illustrates a continuation indicated by a bus master in a slave-to-master transfer using an error signaling window provided in accordance with certain aspects disclosed herein. The slave device actively drives SDA 1602 and SCL 1604 to the high signaling state 1608 at the time 1606 that the bus master has completed transmission of the last symbol (T0) used to encode a data word. The slave device maintains SCL 1604 high while toggling SDA 1602 at each succeeding symbol transmission interval. The combination of high SCL 1604 while SDA 1602 toggles is interpreted as a symbol with a value '2' and a sequence of three or more such symbols is prohibited in data transmissions I3C phase-differential protocols, and is recognized as an error signaling window in bus masters and slave devices configured in accordance with certain aspects of this disclosure. The error signaling window signaling may be produced by a logic circuit in the slave device.

The bus master may include a logic circuit configured to detect the error signaling window independently of the decoding logic in the slave device. In some instances, the error signaling window may be configured to produce more than three symbols with a value '2' at the receiver such that the receiver can recognize the error signaling window when one or more symbols are lost or include an error. The bus master may determine that the error signaling window has been timely received and that no other type of communication error has been detected.

According to one aspect, the bus master may refrain from driving SDA 1602 and SCL 1604 when no error is detected. The slave device may release SCL 1604 to a high impedance state 1610 after the transition corresponding to the third symbol 1612 with a value '2' is transmitted to facilitate the driving of SCL 1604 if needed by the bus master. The bus master may couple a keeper circuit or passive pullup circuit to SCL 1604 before the slave device causes its line driver to enter a high-impedance state 1614. The slave device causes its line driver to actively drive SCL 1604 to the low signal state 1618 after some period of time calculated to provide sufficient time to permit a bus master to request termination. In some examples, the slave device waits for between 1 and 8 symbol intervals to allow the slave device to request termination. In some examples, the slave device stretches one or more symbol intervals to allow the slave device to request termination.

In the described examples, the receiving device can terminate the transfer by activating a driver and causing a change in signaling state of SDA 1302, 1402, 1502 or 1602, and permits the transfer to continue by taking no action to change signaling state. In some implementations, the receiving device may be required to affirmatively acknowledge receipt of one or more data words before the transfer continues. In these implementations, the receiving device permits the transfer to continue by activating a driver and causing a change in signaling state of SDA 1302, 1402, 1502 or 1602, and allows the transfer to terminate transfer by taking no action to change signaling state.

Figure 17:
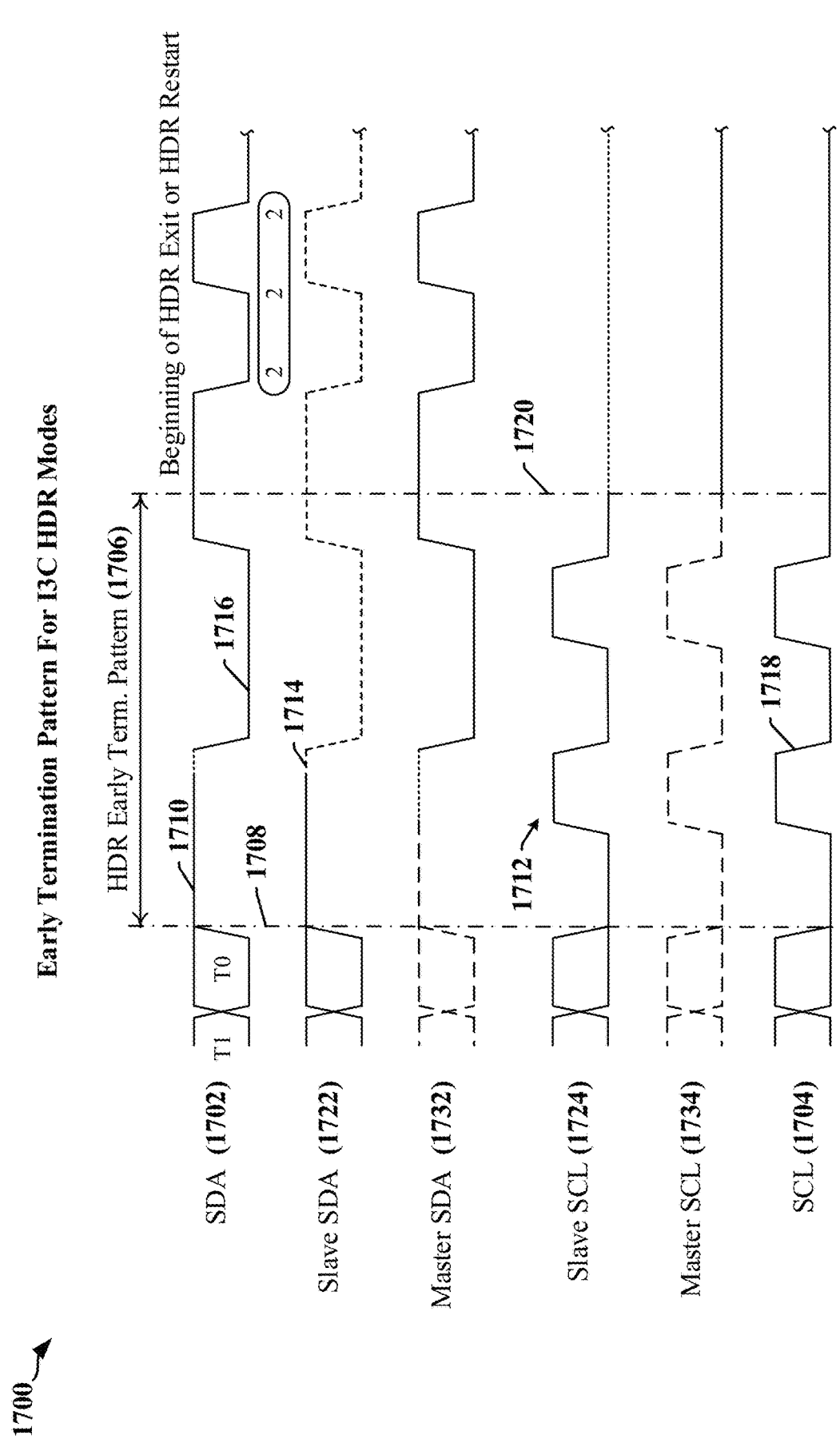
FIG. 17 illustrates a second example of a signaling adaptation used to provide an error signaling window in accordance with certain aspects disclosed herein.

FIG. 17 illustrates a second adaptation of signaling 1700 defined by I3C HDR-TSP and I3C HDR-TSL protocols in accordance with certain aspects disclosed herein. An HDR Early Termination Pattern 1706 may be transmitted after an agreed number of symbols, frames or data words 1708. In the illustrated example, a bus master uses the Early Termination Pattern 1706 to end a data transfer from the slave device. In the example, the slave device provides additional clock pulses 1712 sufficient to enable the bus master to signal a request for early termination. The slave device initially drives SDA 1702 to a high signaling state 1710 before releasing SDA 1702 by causing an output of its line driver to enter a high impedance state 1714. The bus master may couple a keeper circuit or pull-up circuit to SDA 1702 before SDA 1702 is released by the slave device. The bus master may terminate the transfer by driving SDA 1702 to the low signaling state 1716 after the falling edge 1718 of a first of the clock pulses 1712 on SCL 1704. The slave device recognizes the change in state of SDA 1702 after the falling edge of a second of the clock pulses 1712. The slave device releases SCL 1704 at a time 1720, enabling the bus master to control the serial bus and provide HDR Exit or HDR Restart signaling.

In one aspect of the disclosure, the Early Termination Pattern 1706 may be adapted to provide an error signaling window identifier. The error signaling window identifier may be provided by delaying a portion of the Early Termination Pattern 1706.

The timing diagrams 1800, 1900 relate to an example of a serial bus operated in accordance with an I3C HDR-TSP or I3C HDR-TSL protocol. The timing diagrams 1800, 1900 show signaling on SDA 1802, 1902 and SCL 1804, 1904. The timing diagrams 1800, 1900 show also show slave device contribution 1822, 1922 to the signaling on SDA 1802, 1902 and the bus master 1832, 1932 contribution to the signaling on SDA 1802, 1902. The timing diagrams 1800, 1900 further show slave device contribution 1824, 1924 to the signaling on SCL 1804, 1904 and the bus master contribution 1834, 1934 to the signaling on SCL 1804, 1904. Contributions to the signaling on SDA 1802, 1902 or the signaling on SCL 1804, 1904 are shown as solid lines, whereas dashed lines indicate that the driver of a corresponding device is in a high-impedance state. In some instances, the bus master may cause the output of one of its drivers coupled to a line of the serial bus to enter a high impedance state while connecting a keeper circuit or passive pullup or pulldown circuit to the output of the driver to maintain a desired or default signaling state on the line of the serial bus.

Figure 18:
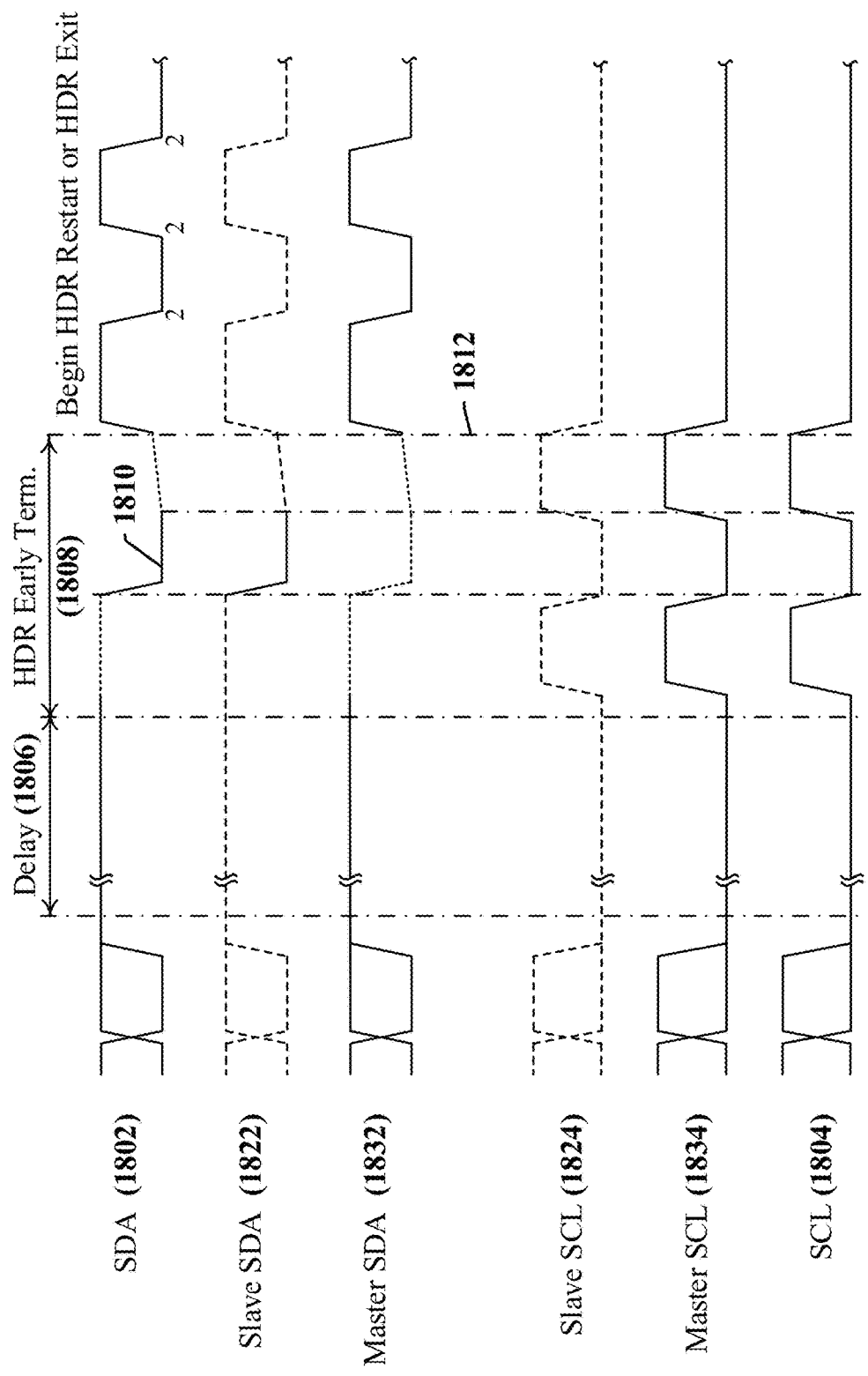
FIGS. 18-21 illustrate the use of an error signaling window provided in accordance with certain aspects disclosed herein.

The timing diagram 1800 in FIG. 18 illustrates termination by a slave device of a master-to-slave transfer using an error signaling window provided in accordance with certain aspects disclosed herein. The bus master actively drives SDA 1802 to the high state and provides clock pulses on SCL 1804 after a delay 1806. After the delay, an Early Termination Pattern 1808 is provided. The Early Termination Pattern 1808 corresponds to the Early Termination Pattern 1706 with the exception of the delay 1806. In the example of FIG. 18, the slave device signals a request to terminate the transfer by driving SDA 1802 to the low state 1810 before releasing SDA 1802 at a time 1812, enabling the bus master to gain control of the serial bus at the falling edge of the second pulse on SCL 1804. The bus master may then provide HDR Restart or HDR Exit signaling.

The duration of the delay 1806 may be selected based on application requirements, bus clock rate and anticipated error rate for bus transmissions. The delay 1806 may include a number of bus clock cycles. In one example, the delay 1806 includes 8 bus clock cycles when a 100 MHz bus clock is used. The delay 1806 causes the receiving device to recognize that the Early Termination Pattern 1808 includes an error signaling window that prevents synchronization errors from causing collisions.

Figure 19:
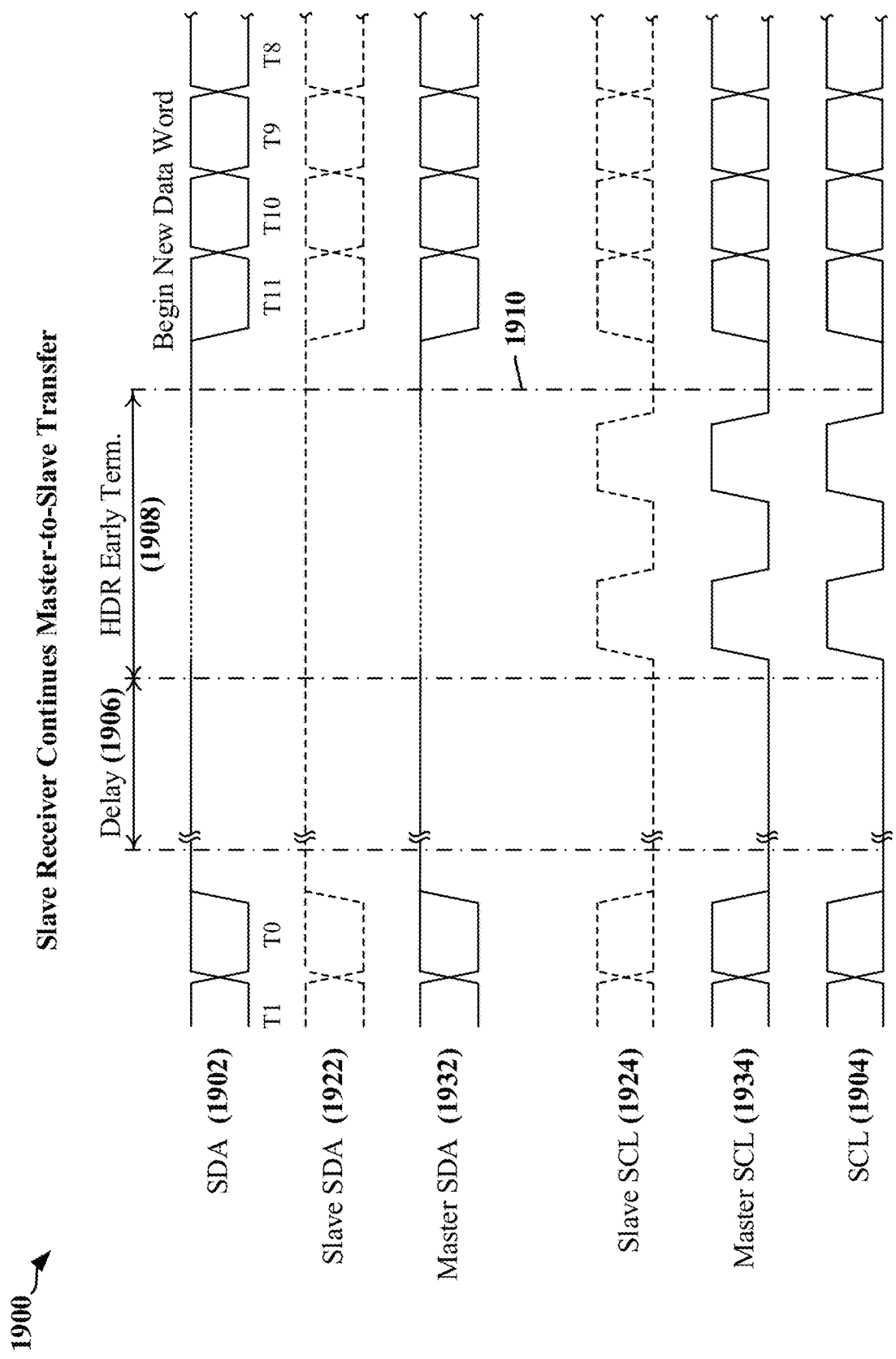

The timing diagram 1900 in FIG. 19 illustrates a transaction where the slave device allows the master-to-slave transfer to continue after detecting an error signaling window provided in accordance with certain aspects disclosed herein. The bus master actively drives SDA 1902 to the high state and actively provides clock pulses on SCL 1904 after a delay 1906. After the delay, an Early Termination Pattern 1908 is provided. The Early Termination Pattern 1908 corresponds to the Early Termination Pattern 1706 with the exception of the delay 1906. In the example of FIG. 19, the slave device refrains from driving SDA 1902, such that the bus master retains control of the serial bus. The bus master may then commence transmission of the next data word at a time 1910.

The duration of the delay 1906 may be selected based on application requirements, bus clock rate and anticipated error rate for bus transmissions. The delay 1906 may include a number of bus clock cycles. In one example, the delay 1906 includes 8 bus clock cycles when a 100 MHz bus clock is used. The delay 1906 causes the receiving device to recognize that the Early Termination Pattern 1908 includes an error signaling window that prevents synchronization errors from causing collisions.

The timing diagrams 2000, 2100 relate to an example of a serial bus operated in accordance with an I3C HDR-TSP or I3C HDR-TSL protocol. The timing diagrams 2000, 2100 show signaling on SDA 2002, 2102 and SCL 2004, 2104. The timing diagrams 2000, 2100 show also show slave device contribution 2022, 2122 to the signaling on SDA 2002, 2102 and the bus master 2032, 2132 contribution to the signaling on SDA 2002, 2102. The timing diagrams 2000, 2100 further show slave device contribution 2024, 2124 to the signaling on SCL 2004, 2104 and the bus master contribution 2034, 2134 to the signaling on SCL 2004, 2104. Contributions to the signaling on SDA 2002, 2102 or the signaling on SCL 2004, 2104 are shown as solid lines, whereas dashed lines indicate that the driver of a corresponding device is in a high-impedance state. In some instances, the bus master may cause the output of one of its drivers coupled to a line of the serial bus to enter a high impedance state while connecting a keeper circuit or passive pullup or pulldown circuit to the output of the driver to maintain a desired or default signaling state on the line of the serial bus.

Figure 20:
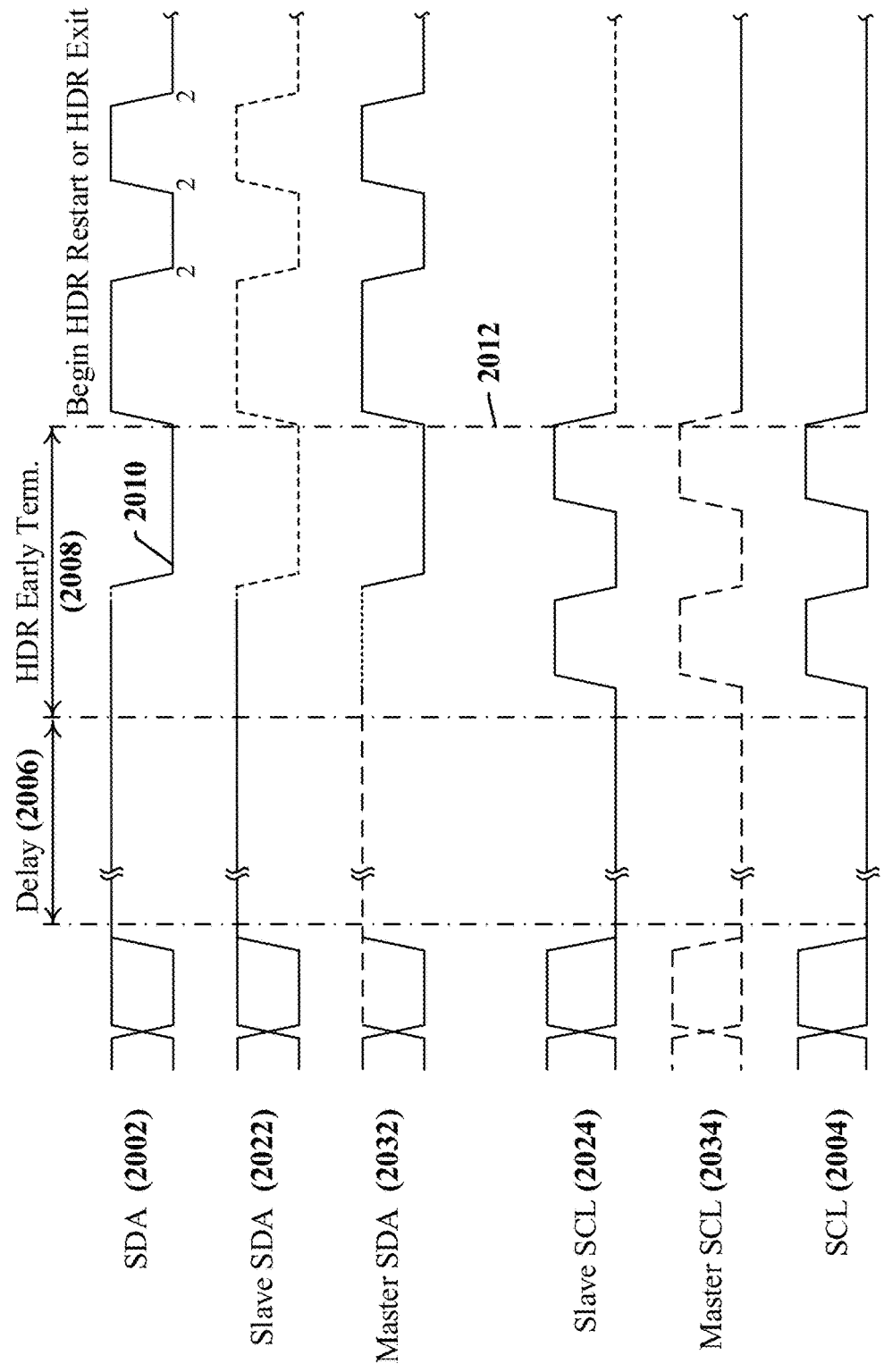

The timing diagram 2000 in FIG. 20 illustrates termination by a bus master of a slave-to-master transfer using an error signaling window provided in accordance with certain aspects disclosed herein. The slave device actively drives SDA 2002 to the high state and provides clock pulses on SCL 2004 after a delay 2006. After the delay, an Early Termination Pattern 2008 is provided. The Early Termination Pattern 2008 corresponds to the Early Termination Pattern 1706 with the exception of the delay 2006. In the example of FIG. 20, the bus master signals a request to terminate the transfer by driving SDA 2002 to the low state 2010 before releasing SDA 2002 at a time 2012. The slave device releases SCL 2004 by entering a high-impedance state, enabling the bus master to gain control of the serial bus at the falling edge of the second pulse on SCL 2004. The bus master may then provide HDR Restart or HDR Exit signaling.

The duration of the delay 2006 may be selected based on application requirements, bus clock rate and anticipated error rate for bus transmissions. The delay 2006 may include a number of bus clock cycles. In one example, the delay 2006 includes 8 bus clock cycles when a 100 MHz bus clock is used. The delay 2006 causes the receiving device to recognize that the Early Termination Pattern 2008 includes an error signaling window that prevents synchronization errors from causing collisions.

Figure 21:
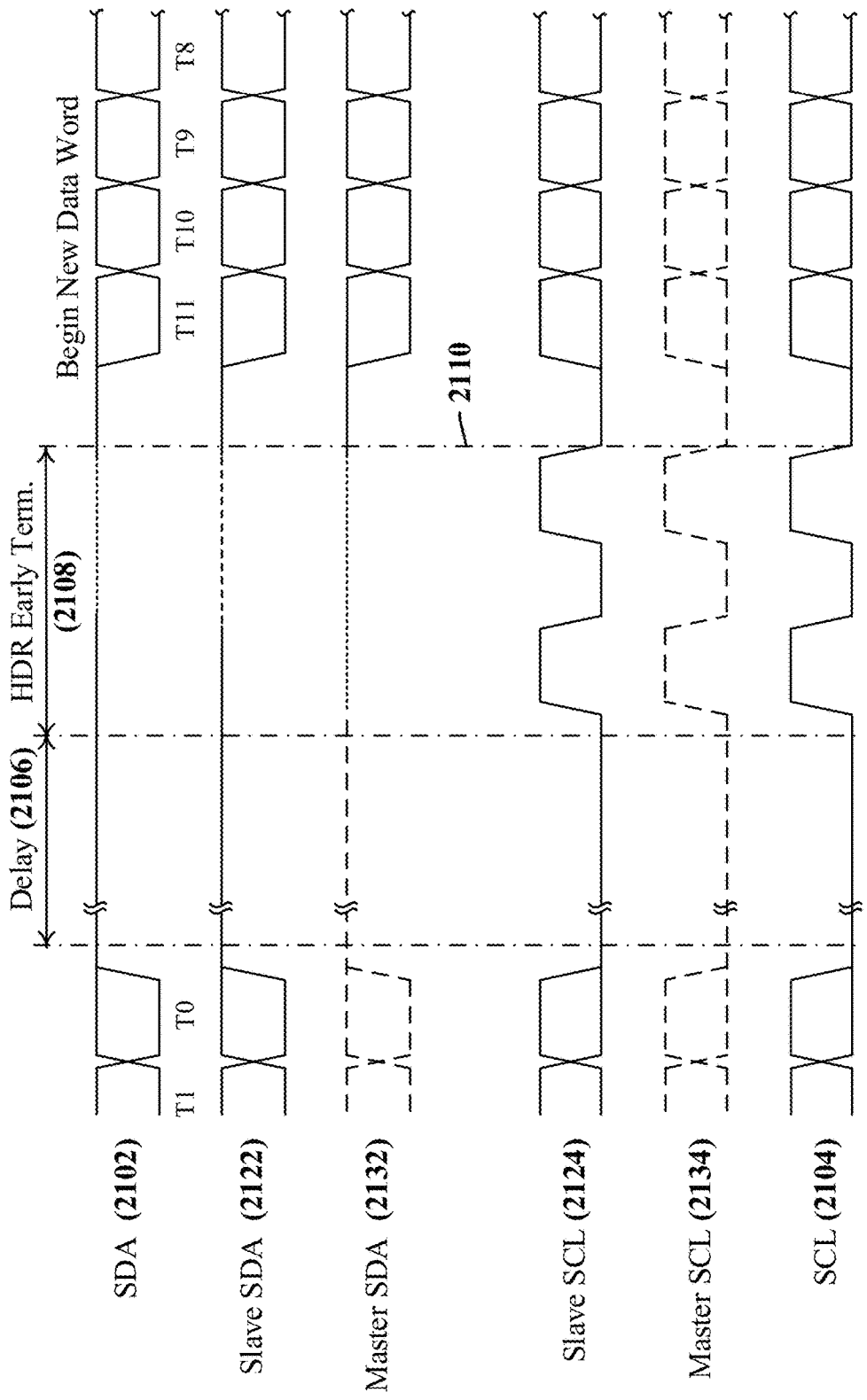

The timing diagram 2100 in FIG. 21 illustrates a transaction where the bus master allows the slave-to-master transfer to continue after detecting an error signaling window provided in accordance with certain aspects disclosed herein. The slave device actively drives SDA 2102 to the high state and provides clock pulses on SCL 2104 after a delay 2106. After the delay, an Early Termination Pattern 2108 is provided. The Early Termination Pattern 2108 corresponds to the Early Termination Pattern 1706 with the exception of the delay 2106. In the example of FIG. 21, the bus master refrains from driving SDA 2102, such that the slave device retains control of the serial bus. The slave device may then commence transmission of the next data word at a time 2110.

The duration of the delay 2106 may be selected based on application requirements, bus clock rate and anticipated error rate for bus transmissions. The delay 2106 may include a number of bus clock cycles. In one example, the delay 2106 includes 8 bus clock cycles when a 100 MHz bus clock is used. The delay 2106 causes the receiving device to recognize that the Early Termination Pattern 2108 includes an error signaling window that prevents synchronization errors from causing collisions.

Examples of Processing Circuits and Methods

Figure 22:
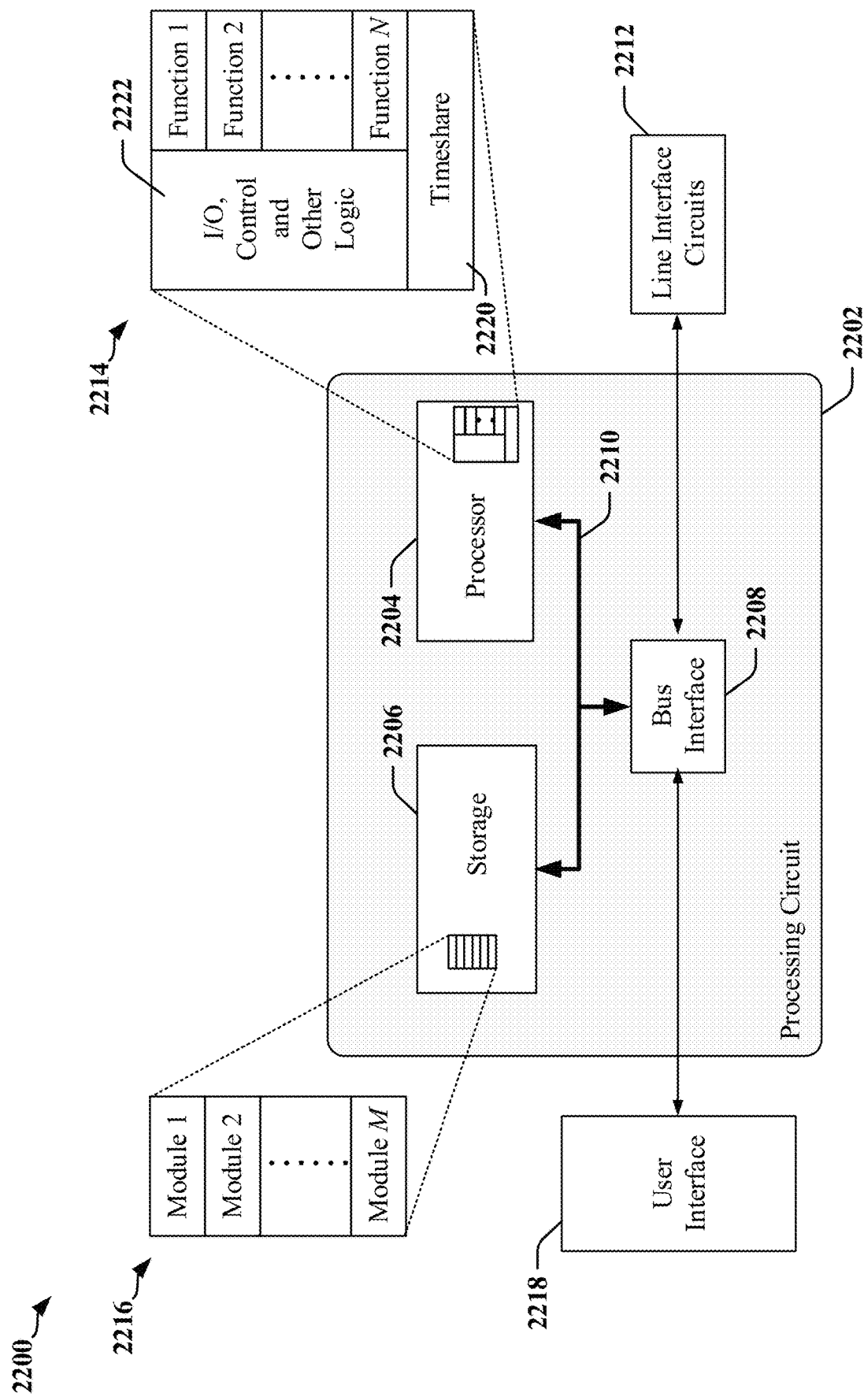
FIG. 22 is a block diagram illustrating an apparatus employing a processing circuit that may be adapted according to certain aspects disclosed herein.

FIG. 22 is a diagram illustrating an example of a hardware implementation for an apparatus 2200 employing a processing circuit 2202 that may be configured to perform one or more functions disclosed herein. In accordance with various aspects of the disclosure, an element, or any portion of an element, or any combination of elements as disclosed herein may be implemented using the processing circuit 2202. The processing circuit 2202 may include one or more processors 2204 that are controlled by some combination of hardware and software modules. Examples of processors 2204 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 2204 may include specialized processors that perform specific functions, and that may be configured, augmented or controlled by one of the software modules 2216. The one or more processors 2204 may be configured through a combination of software modules 2216 loaded during initialization, and further configured by loading or unloading one or more software modules 2216 during operation. In various examples, the processing circuit 2202 may be implemented using a state machine, sequencer, signal processor and/or general-purpose processor, or a combination of such devices and circuits.

In the illustrated example, the processing circuit 2202 may be implemented with a bus architecture, represented generally by the bus 2210. The bus 2210 may include any number of interconnecting buses and bridges depending on the specific application of the processing circuit 2202 and the overall design constraints. The bus 2210 links together various circuits including the one or more processors 2204, and storage 2206. Storage 2206 may include memory devices and mass storage devices, and may be referred to herein as computer-readable media and/or processor-readable media. The bus 2210 may also link various other circuits such as timing sources, timers, peripherals, voltage regulators, and power management circuits. A bus interface 2208 may provide an interface between the bus 2210 and one or more transceivers 2212. A transceiver 2212 may be provided for each networking technology supported by the processing circuit 2202. In some instances, multiple networking technologies may share some or all of the circuitry or processing modules found in a transceiver 2212. Each transceiver 2212 provides a means for communicating with various other apparatus over a transmission medium. Depending upon the nature of the apparatus 2200, a user interface 2218 (e.g., keypad, display, speaker, microphone, joystick) may also be provided, and may be communicatively coupled to the bus 2210 directly or through the bus interface 2208.

A processor 2204 may be responsible for managing the bus 2210 and for general processing that may include the execution of software stored in a computer-readable medium that may include the storage 2206. In this respect, the processing circuit 2202, including the processor 2204, may be used to implement any of the methods, functions and techniques disclosed herein. The storage 2206 may be used for storing data that is manipulated by the processor 2204 when executing software, and the software may be configured to implement any one of the methods disclosed herein.

One or more processors 2204 in the processing circuit 2202 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2206 or in an external computer-readable medium. The external computer-readable medium and/or storage 2206 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 2206 may also include, by way of example, a carrier wave, a transmission line, and any other suitable medium for transmitting software and/or instructions that may be accessed and read by a computer. Computer-readable medium and/or the storage 2206 may reside in the processing circuit 2202, in the processor 2204, external to the processing circuit 2202, or be distributed across multiple entities including the processing circuit 2202. The computer-readable medium and/or storage 2206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2206 may maintain software maintained and/or organized in loadable code segments, modules, applications, programs, etc., which may be referred to herein as software modules 2216. Each of the software modules 2216 may include instructions and data that, when installed or loaded on the processing circuit 2202 and executed by the one or more processors 2204, contribute to a run-time image 2214 that controls the operation of the one or more processors 2204. When executed, certain instructions may cause the processing circuit 2202 to perform functions in accordance with certain methods, algorithms and processes described herein.

Some of the software modules 2216 may be loaded during initialization of the processing circuit 2202, and these software modules 2216 may configure the processing circuit 2202 to enable performance of the various functions disclosed herein. For example, some software modules 2216 may configure internal devices and/or logic circuits 2222 of the processor 2204, and may manage access to external devices such as the transceiver 2212, the bus interface 2208, the user interface 2218, timers, mathematical coprocessors, and so on. The software modules 2216 may include a control program and/or an operating system that interacts with interrupt handlers and device drivers, and that controls access to various resources provided by the processing circuit 2202. The resources may include memory, processing time, access to the transceiver 2212, the user interface 2218, and so on.

One or more processors 2204 of the processing circuit 2202 may be multifunctional, whereby some of the software modules 2216 are loaded and configured to perform different functions or different instances of the same function. The one or more processors 2204 may additionally be adapted to manage background tasks initiated in response to inputs from the user interface 2218, the transceiver 2212, and device drivers, for example. To support the performance of multiple functions, the one or more processors 2204 may be configured to provide a multitasking environment, whereby each of a plurality of functions is implemented as a set of tasks serviced by the one or more processors 2204 as needed or desired. In one example, the multitasking environment may be implemented using a timesharing program 2220 that passes control of a processor 2204 between different tasks, whereby each task returns control of the one or more processors 2204 to the timesharing program 2220 upon completion of any outstanding operations and/or in response to an input such as an interrupt. When a task has control of the one or more processors 2204, the processing circuit is effectively specialized for the purposes addressed by the function associated with the controlling task. The timesharing program 2220 may include an operating system, a main loop that transfers control on a round-robin basis, a function that allocates control of the one or more processors 2204 in accordance with a prioritization of the functions, and/or an interrupt driven main loop that responds to external events by providing control of the one or more processors 2204 to a handling function.

Figure 23:
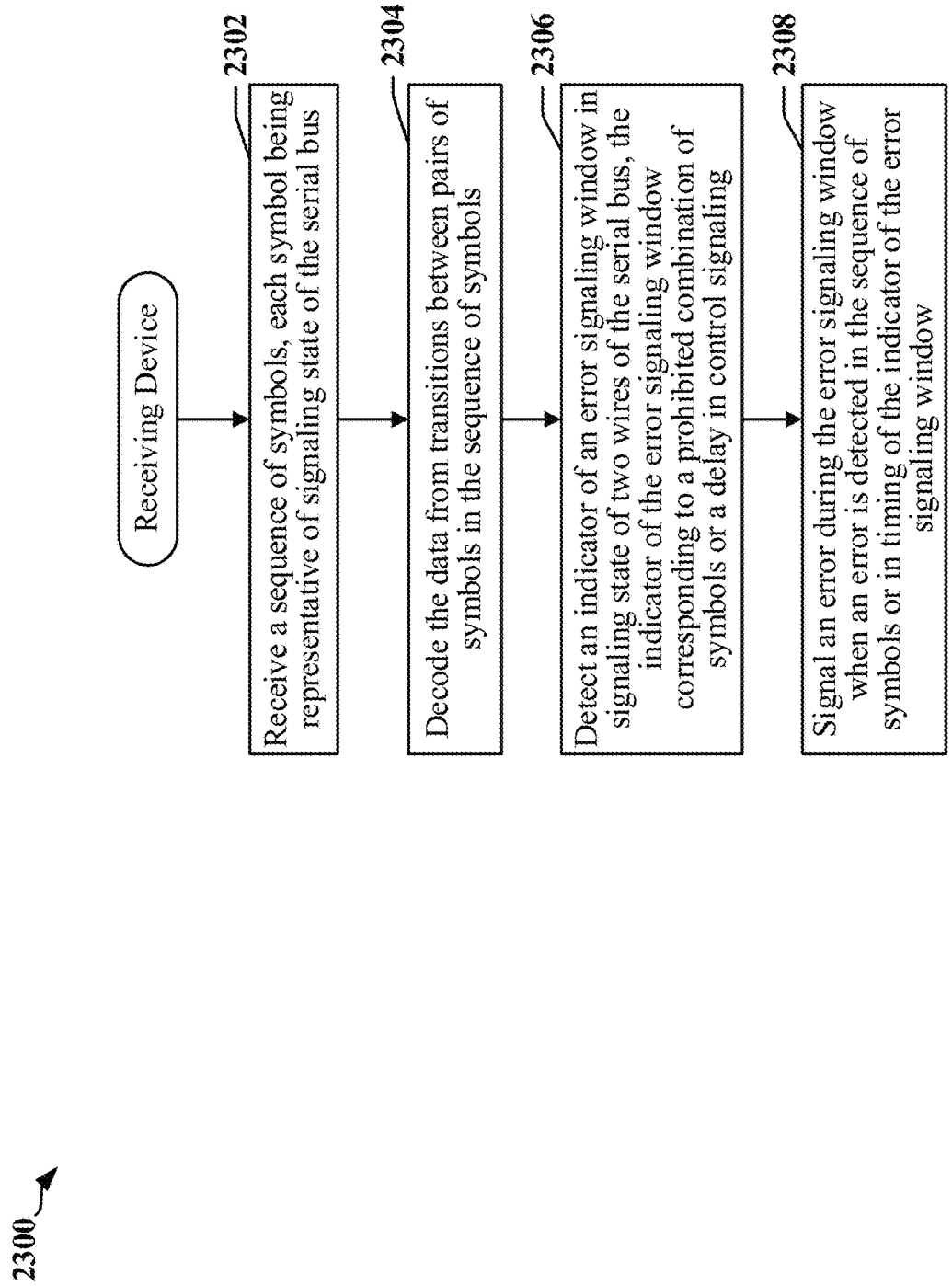
FIG. 23 is a flowchart illustrating certain aspects of method for receiving data at a device coupled to a serial bus in accordance with certain aspects disclosed herein.

FIG. 23 is a flowchart 2300 illustrating a method that may be performed at a receiving device coupled to a serial bus. The serial bus may be operated in accordance with one or more I3C protocols. At block 2302, the receiving device may receive a sequence of symbols. Each symbol may be representative of signaling state of the serial bus. For example, a 2-bit symbol may be used to represent binary state of two wires of the serial bus, a 3-bit symbol may be used to represent binary state of three wires of the serial bus, and so on. At block 2304, the receiving device may decode the data from transitions between pairs of symbols in the sequence of symbols. For example, the receiving device may represent the difference between consecutive signaling states using a transition number, where the data can be extracted from the transition numbers generated from the sequence of symbols.

At block 2306, the receiving device may detect an indicator of an error signaling window in signaling state of two wires of the serial bus. In some implementations, the indicator of the error signaling window corresponds to a prohibited combination of symbols. For example, the prohibited combination of symbols may generate a signaling pattern that provoke a response to a device that is not otherwise involved in the data transfer. In some implementations, the error signaling window is indicated when certain control signaling is delayed. In some implementations, the indicator of the error signaling window precedes the error signaling window by one or more symbol intervals.

At block 2308, the receiving device may signal an error during the error signaling window when an error is detected in the sequence of symbols or in timing of the indicator of the error signaling window. In some examples, the error detected in the sequence of symbols involves a parity error. The error may be detected when the indicator of the error signaling window commences at an unexpected time or at an unexpected location in the sequence of symbols, wherein the device is preconfigured with an indication of expected time or location in the sequence of symbols of the error signaling window. The error may be detected when the indicator of the error signaling window commences before a complete sequence of symbols is received. The error may be detected when the sequence of symbols includes one or more symbols of the prohibited combination of symbols.

In some implementations, the data is decoded using a phase-differential decoder and the error is detected in the sequence of symbols or in the timing of the indicator of the error signaling window using a detection circuit that operates independently of the phase-differential decoder.

In some examples, the receiving device is configured to operate as a slave device and transmission of the data may be terminated after the device has signaled the error. In other examples, the receiving device is operated as a bus master and transmits a signaling pattern configured to terminate transmission of the data after signaling the error.

In one example, the receiving device may detect the indicator of the error signaling window when an early termination pattern is delayed. In another example, the receiving device may detect the indicator of the error signaling window when a first wire of the two wires is toggled after each of three or more symbol intervals while a second wire of the two wires of the serial bus is maintained in a first signaling state. A later-transmitted or earlier-transmitted synchronizing pattern may be detected when the first wire of the two wires is toggled after each of three or more symbol intervals while the second wire of the two wires of the serial bus is maintained in a second signaling state.

Figure 24:
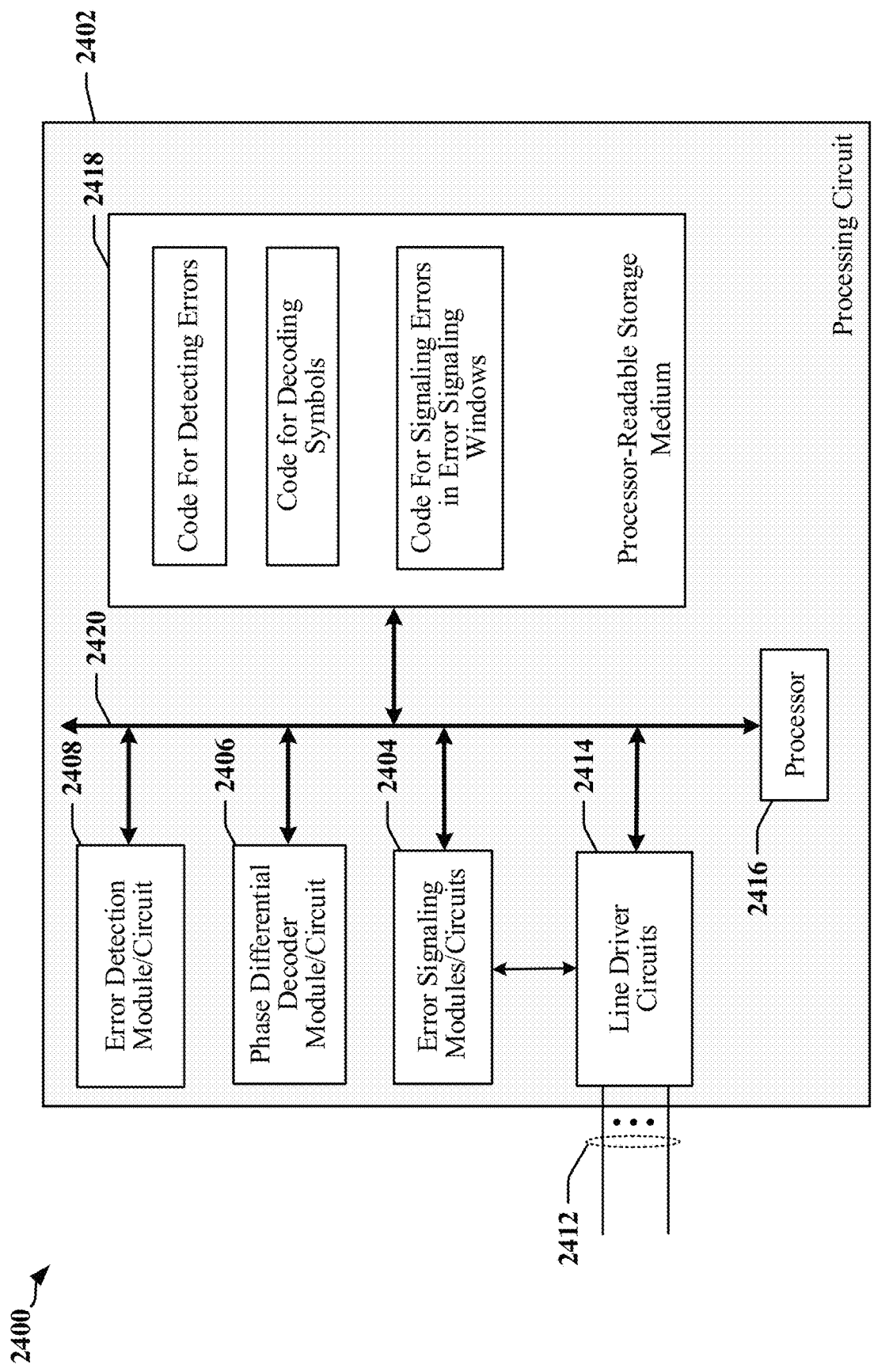
FIG. 24 illustrates a hardware implementation for an apparatus that operates as a receiving device in accordance with certain aspects disclosed herein.

FIG. 24 is a diagram illustrating an example of a hardware implementation for an apparatus 2400 employing a processing circuit 2402. In one example, the apparatus 2400 is configured for data communication over a serial bus that is operated in accordance with one or more I3C protocols. The processing circuit 2402 typically has a controller or processor 2416 that may include one or more microprocessors, microcontrollers, digital signal processors, sequencers and/or state machines. The processing circuit 2402 may be implemented with a bus architecture, represented generally by the bus 2420. The bus 2420 may include any number of interconnecting buses and bridges depending on the specific application of the processing circuit 2402 and the overall design constraints. The bus 2420 links together various circuits including one or more processors and/or hardware modules, represented by the controller or processor 2416, the modules or circuits 2404, 2406 and 2408, and the processor-readable storage medium 2418. The apparatus 2400 may be coupled to a multi-wire communication link using a physical layer circuit 2414. The physical layer circuit 2414 may operate the multi-wire serial bus 2412 to support communications in accordance with I3C protocols. The bus 2420 may also link various other circuits such as timing sources, peripherals, voltage regulators, and power management circuits, which are well known in the art, and therefore, will not be described any further.

The processor 2416 is responsible for general processing, including the execution of software, code and/or instructions stored on the processor-readable storage medium 2418. The processor-readable storage medium 2418 may include non-transitory storage media. The software, when executed by the processor 2416, causes the processing circuit 2402 to perform the various functions described supra for any particular apparatus. The processor-readable storage medium 2418 may be used for storing data that is manipulated by the processor 2416 when executing software. The processing circuit 2402 further includes at least one of the modules 2404, 2406 and 2408. The modules 2404, 2406 and 2408 may be software modules running in the processor 2416, resident/stored in the processor-readable storage medium 2418, one or more hardware modules coupled to the processor 2416, or some combination thereof. The modules 2404, 2406 and 2408 may include microcontroller instructions, state machine configuration parameters, or some combination thereof.

In one configuration, the apparatus 2400 is a data communication apparatus that includes physical layer circuit 2414 that may include one or more line driver circuits coupled to the multi-wire serial bus 2412. The apparatus 2400 includes modules and/or circuits 2406 configured to decode data from sequences of symbols received from the multi-wire serial bus 2412, and modules and/or circuits 2408 configured to detect errors in the sequences of symbols received or in the data decoded from the sequences of symbols. The apparatus 2400 includes modules and/or circuits 2404 configured to detect error signaling windows for data transfers conducted over the multi-wire serial bus 2412 and to signal errors within the error signaling windows.

In one example, the apparatus 2400 includes a bus interface configured to couple the apparatus to the multi-wire serial bus 2412, a phase-differential decoder configured to decode data from transitions between pairs of symbols in a sequence of symbols received from the serial bus, each symbol being representative of signaling state of the serial bus, and a processor 2416. The processor 2416 may be configured to detect an indicator of an error signaling window in signaling state of two wires of the serial bus, the indicator of the error signaling window corresponding to a prohibited combination of symbols or a delay in control signaling, and signal an error through the bus interface during the error signaling window when an error is detected in the sequence of symbols or in timing of the indicator of the error signaling window.

In one example, the error detected in the sequence of symbols includes a parity error. In another example, the processor 2416 is further configured to detect the error when the indicator of the error signaling window commences at an unexpected time or at an unexpected location in the sequence of symbols, wherein the device is preconfigured with an indication of expected time or location in the sequence of symbols of the error signaling window. In another example, the processor 2416 is further configured to detect the error when the indicator of the error signaling window commences before a complete sequence of symbols is received. The processor 2416 may be further configured to detect the error when the sequence of symbols includes one or more symbols of the prohibited combination of symbols. In some implementations, the indicator of the error signaling window precedes the error signaling window by one or more symbol intervals.

In some implementations the apparatus 2400 includes a detection circuit configured to detect the error in the sequence of symbols or in the timing of the indicator of the error signaling window independently of the phase-differential decoder. The detection circuit may be further configured to detect the indicator of the error signaling window when a first wire of the two wires is toggled after each of three or more symbol intervals while a second wire of the two wires of the serial bus is maintained in a first signaling state. A later-transmitted or earlier-transmitted synchronizing pattern may be detected when the first wire of the two wires is toggled after each of three or more symbol intervals while the second wire of the two wires of the serial bus is maintained in a second signaling state.

The detection circuit may be further configured to detect the indicator of the error signaling window when an early termination pattern is delayed.

In some instances, the apparatus is configured to operate as a slave device, and transmission of the data is terminated after signaling the error. In some instances, the processor is further configured to operate the device as a bus master and transmit a signaling pattern configured to terminate transmission of the data after signaling the error.

The processor-readable storage medium 2418 may include instructions that cause the processing circuit 2402 to receive a sequence of symbols, each symbol being representative of signaling state of the serial bus, decode the data from transitions between pairs of symbols in the sequence of symbols, detect an indicator of an error signaling window in signaling state of two wires of the serial bus, the indicator of the error signaling window corresponding to a prohibited combination of symbols or a delay in control signaling, and signal an error during the error signaling window when an error is detected in the sequence of symbols or in timing of the indicator of the error signaling window.

In some examples, the error detected in the sequence of symbols includes a parity error. The error may be detected when the indicator of the error signaling window commences at an unexpected time or at an unexpected location in the sequence of symbols, wherein the device is preconfigured with an indication of expected time or location in the sequence of symbols of the error signaling window. The error may be detected when the indicator of the error signaling window commences before a complete sequence of symbols is received. The error may be detected when the sequence of symbols includes one or more symbols of the prohibited combination of symbols. In some implementations, the data is decoded using a phase-differential decoder and the error is detected in the sequence of symbols or in the timing of the indicator of the error signaling window using a detection circuit that operates independently of the phase-differential decoder.

In some examples, the processor-readable storage medium 2418 may include instructions that cause the processing circuit 2402 to operate the apparatus 2400 as a slave device and transmission of the data may be terminated after the processing circuit 2402 has signaled the error. In other examples, the apparatus 2400 is operated as a bus master and transmits a signaling pattern configured to terminate transmission of the data after signaling the error. In some implementations, the indicator of the error signaling window precedes the error signaling window by one or more symbol intervals.

In one example, the processor-readable storage medium 2418 may include instructions that cause the processing circuit 2402 to detect the indicator of the error signaling window when a first wire of the two wires is toggled after each of three or more symbol intervals while a second wire of the two wires of the serial bus is maintained in a first signaling state. A later-transmitted or earlier-transmitted synchronizing pattern may be detected when the first wire of the two wires is toggled after each of three or more symbol intervals while the second wire of the two wires of the serial bus is maintained in a second signaling state. In another example, the processor-readable storage medium 2418 may include instructions that cause the processing circuit 2402 to detect the indicator of the error signaling window when an early termination pattern is delayed.

Figure 25:
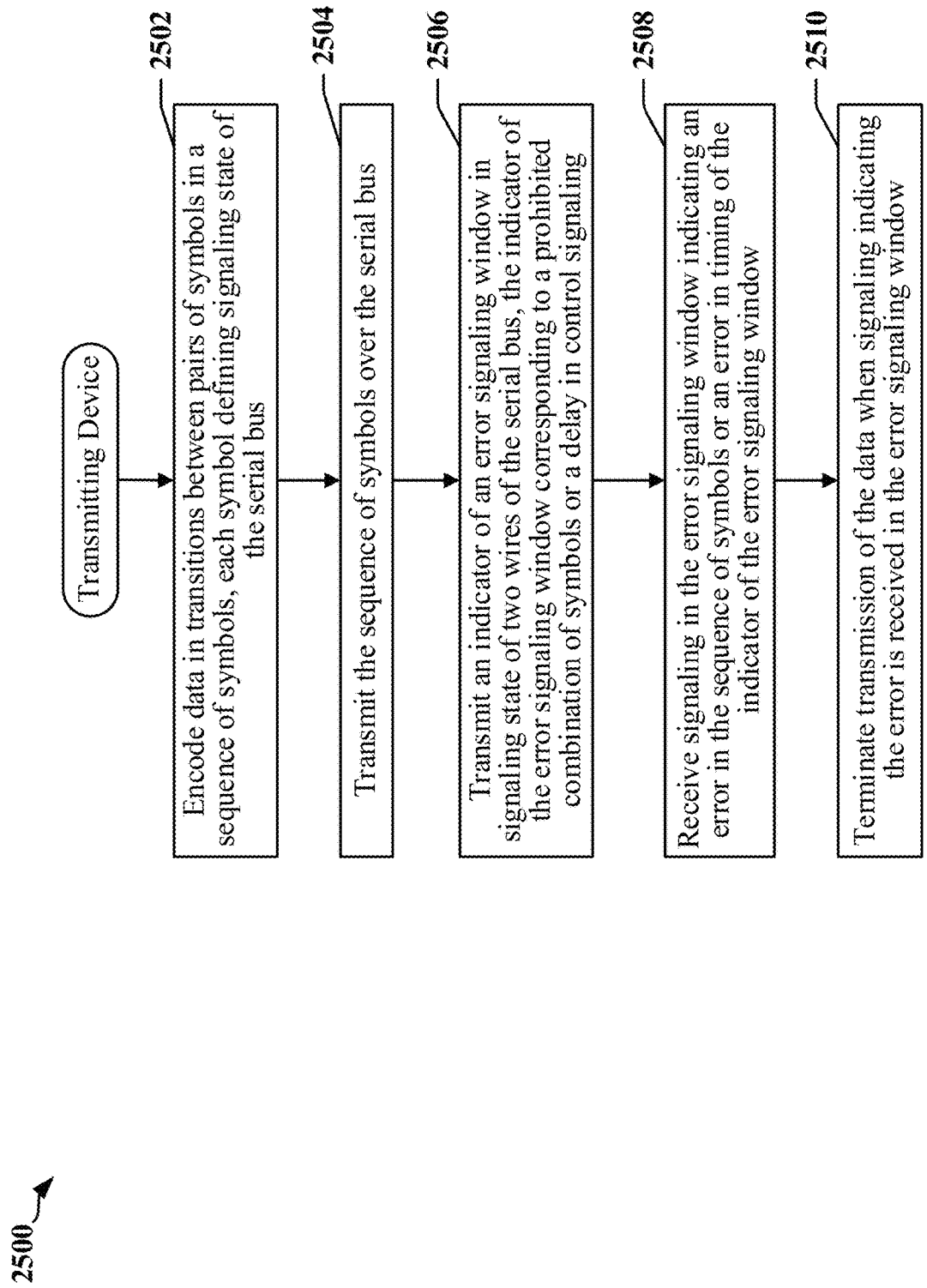
FIG. 25 is a flowchart illustrating certain aspects of method for transmitting data from a device coupled to a serial bus in accordance with certain aspects disclosed herein.

FIG. 25 is a flowchart 2500 illustrating a method that may be performed at a transmitting device coupled to a serial bus. The serial bus may be operated in accordance with one or more I3C protocols. At block 2502, the transmitting device may encode the data in transitions between pairs of symbols in a sequence of symbols. Each symbol may define signaling state of the serial bus. For example, a 2-bit symbol may define binary state of two wires of the serial bus in a symbol transmission interval, a 3-bit symbol define binary state of three wires of the serial bus in a symbol transmission interval, and so on. At block 2504, the transmitting device may transmit the sequence of symbols over the serial bus.

At block 2506, the transmitting device may transmit an indicator of an error signaling window in signaling state of two wires of the serial bus. The indicator of the error signaling window may correspond to a prohibited combination of symbols or a delay in control signaling. In one example, the prohibited combination of symbols may generate a signaling pattern that provokes a response to a device that is not otherwise involved in the data transfer. In some examples, the transmitting device may transmit the indicator of the error signaling window at a preconfigured time or location in the sequence of symbols. At block 2508, the transmitting device may receive receiving signaling in the error signaling window indicating an error in the sequence of symbols or an error in timing of the indicator of the error signaling window. At block 2510, the transmitting device may terminate transmission of the data when signaling indicating the error is received in the error signaling window.

In some examples, the transmitting device may encode the data using a phase-differential encoder and may generate the indicator of the error signaling window using a circuit that operates independently of the phase-differential encoder.

In some implementations, the transmitting device may generate the indicator of the error signaling window by delaying an early termination pattern. The transmitting device may operate as a bus master or as a slave device. In some implementations, the transmitting device may generate the indicator of the error signaling window by toggling a first wire of the two wires after each of three or more symbol intervals while a second wire of the two wires of the serial bus is maintained in a first signaling state. A later-transmitted or earlier-transmitted synchronizing pattern may be detected when the first wire of the two wires is toggled after each of three or more symbol intervals while the second wire of the two wires of the serial bus is maintained in a second signaling state.

Figure 26:
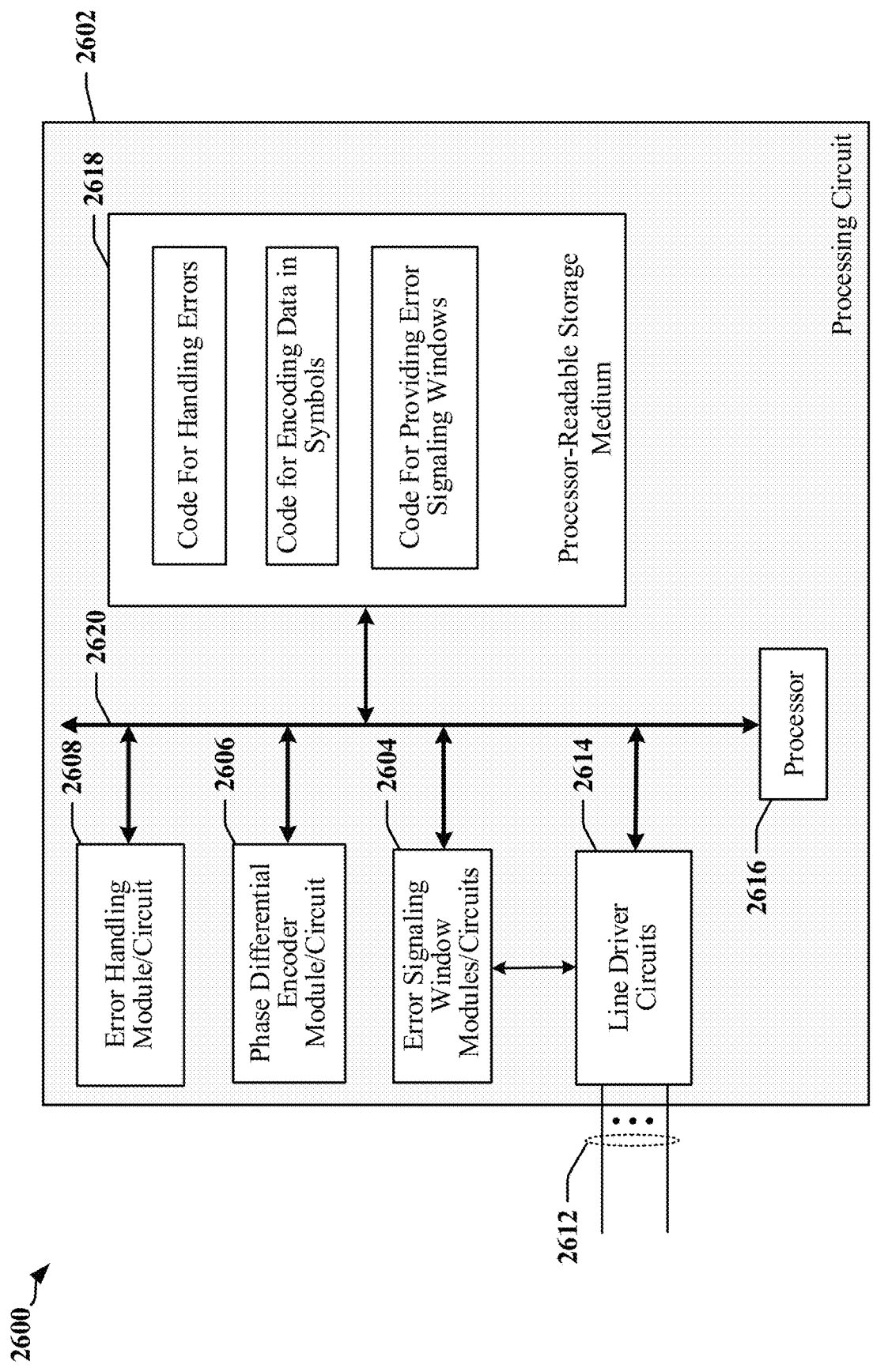
FIG. 26 illustrates a hardware implementation for an apparatus that operates as a transmitting device in accordance with certain aspects disclosed herein.

FIG. 26 is a diagram illustrating an example of a hardware implementation for an apparatus 2600 employing a processing circuit 2602. In one example, the apparatus 2600 is configured for data communication over a serial bus that is operated in accordance with one or more I3C protocols. The processing circuit 2602 typically has a controller or processor 2616 that may include one or more microprocessors, microcontrollers, digital signal processors, sequencers and/or state machines. The processing circuit 2602 may be implemented with a bus architecture, represented generally by the bus 2620. The bus 2620 may include any number of interconnecting buses and bridges depending on the specific application of the processing circuit 2602 and the overall design constraints. The bus 2620 links together various circuits including one or more processors and/or hardware modules, represented by the controller or processor 2616, the modules or circuits 2604, 2606 and 2608, and the processor-readable storage medium 2618. The apparatus 2600 may be coupled to a multi-wire communication link using a physical layer circuit 2614. The physical layer circuit 2614 may operate the multi-wire serial bus 2612 to support communications in accordance with I3C protocols. The bus 2620 may also link various other circuits such as timing sources, peripherals, voltage regulators, and power management circuits, which are well known in the art, and therefore, will not be described any further.

The processor 2616 is responsible for general processing, including the execution of software, code and/or instructions stored on the processor-readable storage medium 2618. The processor-readable storage medium 2618 may include non-transitory storage media. The software, when executed by the processor 2616, causes the processing circuit 2602 to perform the various functions described supra for any particular apparatus. The processor-readable storage medium 2618 may be used for storing data that is manipulated by the processor 2616 when executing software. The processing circuit 2602 further includes at least one of the modules 2604, 2606 and 2608. The modules 2604, 2606 and 2608 may be software modules running in the processor 2616, resident/stored in the processor-readable storage medium 2618, one or more hardware modules coupled to the processor 2616, or some combination thereof. The modules 2604, 2606 and 2608 may include microcontroller instructions, state machine configuration parameters, or some combination thereof.

In one configuration, the apparatus 2600 includes physical layer circuit 2614 that may include one or more line driver circuits coupled to the multi-wire serial bus 2612. The apparatus 2600 includes modules and/or circuits 2606 configured to encode data in sequences of symbols to be transmitted over the multi-wire serial bus 2612, and modules and/or circuits 2608 configured to handle errors in the sequences of symbols or in the data decoded from the sequences of symbols as reported by a receiving device. The apparatus 2600 includes modules and/or circuits 2604 configured to provide error signaling windows for use in data transfers conducted over the multi-wire serial bus 2612 and to monitor the error signaling windows.

In one example, the apparatus 2600 includes a bus interface configured to couple the apparatus to the multi-wire serial bus 2612, a phase-differential encoder configured to decode data from transitions between pairs of symbols in a sequence of symbols received from the serial bus, each symbol being representative of signaling state of the serial bus, and a processor 2616. The processor 2616 may be configured to transmit an indicator of an error signaling window in signaling state of two wires of the serial bus. The indicator of the error signaling window may correspond to a prohibited combination of symbols or a delay in control signaling. The processor 2616 may be further configured to receive signaling in the error signaling window indicating an error in the sequence of symbols or an error in timing of the indicator of the error signaling window. The processor 2616 may be further configured to terminate transmission of the data when signaling indicating the error is received in the error signaling window. The processor 2616 may be further configured to terminate transmission of the data when signaling indicating the error is received in the error signaling window.

In some implementations, the apparatus 2600 includes a signaling circuit configured to generate the indicator of the error signaling window independently of the phase-differential encoder. The signaling circuit may be configured to generate the indicator of the error signaling window by delaying an early termination pattern. The signaling circuit may be configured to generate the indicator of the error signaling window by toggling a first wire of the two wires after each of three or more symbol intervals while maintaining a second wire of the two wires of the serial bus in a first signaling state. A later-transmitted or earlier-transmitted synchronizing pattern may be detected when the first wire of the two wires is toggled after each of three or more symbol intervals while the second wire of the two wires of the serial bus is maintained in a second signaling state. In some examples, the signaling circuit may be configured to transmit the indicator of the error signaling window at a preconfigured time or location in the sequence of symbols.

The processor-readable storage medium 2618 may include instructions that cause the processing circuit 2602 to encode the data in transitions between pairs of symbols in a sequence of symbols, each symbol defining signaling state of the serial bus, transmit the sequence of symbols over the serial bus, transmit an indicator of an error signaling window in signaling state of two wires of the serial bus, the indicator of the error signaling window corresponding to a prohibited combination of symbols or a delay in control signaling, and receive signaling in the error signaling window indicating an error in the sequence of symbols or an error in timing of the indicator of the error signaling window. In some examples, the processor-readable storage medium 2618 may include instructions that cause the processing circuit 2602 to terminate transmission of the data when signaling indicating the error is received in the error signaling window.

In some examples, the transmitting device may encode the data using a phase-differential encoder and may generate the indicator of the error signaling window using a circuit that operates independently of the phase-differential encoder.

In some examples, the processor-readable storage medium 2618 may include instructions that cause the processing circuit 2602 to generate the indicator of the error signaling window by toggling a first wire of the two wires after each of three or more symbol intervals while maintaining a second wire of the two wires of the serial bus in a first signaling state. A later-transmitted or earlier-transmitted synchronizing pattern may be detected when the first wire of the two wires is toggled after each of three or more symbol intervals while the second wire of the two wires of the serial bus is maintained in a second signaling state. In some examples, the processor-readable storage medium 2618 may include instructions that cause the processing circuit 2602 to generate the indicator of the error signaling window by delaying an early termination pattern. The transmitting device may operate as a bus master or as a slave device.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for receiving data at a device coupled to a serial bus, comprising:
   receiving a sequence of symbols, each symbol being representative of signaling state of the serial bus;
   decoding the data from transitions between pairs of symbols in the sequence of symbols;
   detecting an indicator of an error signaling window in signaling state of two wires of the serial bus when a first wire of the two wires of the serial bus is toggled after each of three or more symbol intervals while a second wire of the two wires of the serial bus is maintained in a first signaling state, wherein indicators of the error signaling window comprise a prohibited combination of symbols or a delay in control signaling;
   detecting a synchronizing pattern when the first wire of the two wires of the serial bus is toggled after each of three or more symbol intervals while the second wire of the two wires of the serial bus is maintained in a second signaling state; and
   signaling an error during the error signaling window when the error is detected in the sequence of symbols or in timing of the indicators of the error signaling window.

2. The method of claim 1, wherein the error detected in the sequence of symbols comprises a parity error.

3. The method of claim 1, further comprising:
   detecting the error when the indicators of the error signaling window commence at an unexpected time or at an unexpected location in the sequence of symbols, wherein the device is preconfigured with an indication of expected time or location in the sequence of symbols of the error signaling window.

4. The method of claim 1, further comprising:
   detecting the error when the indicators of the error signaling window commence before a complete sequence of symbols is received.

5. The method of claim 1, wherein the indicators of the error signaling window precede the error signaling window by one or more symbol intervals.

6. The method of claim 1, further comprising:
   decoding the data using a phase-differential decoder; and
   detecting the error in the sequence of symbols or in the timing of the indicators of the error signaling window using a detection circuit that operates independently of the phase-differential decoder.

7. The method of claim 1, wherein the device is configured to operate as a slave device, and wherein transmission of the data is terminated after signaling the error.

8. The method of claim 1, further comprising:
   operating the device as a bus master; and
   transmitting a signaling pattern configured to terminate transmission of the data after signaling the error.

9. The method of claim 1, further comprising:
   detecting a high data-rate (HDR) error signaling window indicator when an HDR early termination pattern is delayed.

10. A data communication apparatus, comprising:
    a bus interface configured to couple the data communication apparatus to a serial bus;
    a phase-differential decoder configured to decode data from transitions between pairs of symbols in a sequence of symbols received from the serial bus, each symbol being representative of signaling state of the serial bus; and
    a processor configured to:
       detect an indicator of an error signaling window in signaling state of two wires of the serial bus when a first wire of the two wires of the serial bus is toggled after each of three or more symbol intervals while a second wire of the two wires of the serial bus is maintained in a first signaling state, wherein indicators of the error signaling window comprise a prohibited combination of symbols or a delay in control signaling;
       detect a synchronizing pattern when the first wire of the two wires of the serial bus is toggled after each of three or more symbol intervals while the second wire of the two wires of the serial bus is maintained in a second signaling state; and
       signal an error through the bus interface during the error signaling window when the error is detected in the sequence of symbols or in timing of the indicators of the error signaling window.

11. The data communication apparatus of claim 10, wherein the error detected in the sequence of symbols comprises a parity error.

12. The data communication apparatus of claim 10, wherein the processor is further configured to:
    detect the error when the indicators of the error signaling window commence at an unexpected time or at an unexpected location in the sequence of symbols, wherein the data communication apparatus is preconfigured with an indication of expected time or location in the sequence of symbols of the error signaling window.

13. The data communication apparatus of claim 10, wherein the processor is further configured to:
    detect the error when the indicators of the error signaling window commence before a complete sequence of symbols is received.

14. The data communication apparatus of claim 10, wherein the indicators of the error signaling window precede the error signaling window by one or more symbol intervals.

15. The data communication apparatus of claim 10, further comprising:
    a detection circuit configured to detect the error in the sequence of symbols or in the timing of the indicators of the error signaling window independently of the phase-differential decoder.

16. The data communication apparatus of claim 15, wherein the detection circuit is further configured to:

detect a high data-rate (HDR) error signaling window indicator when an HDR early termination pattern is delayed.

17. The data communication apparatus of claim 10, wherein the data communication apparatus is configured to operate as a slave device, and wherein transmission of the data is terminated after signaling the error.

18. The data communication apparatus of claim 10, wherein the processor is further configured to:
operate the data communication apparatus as a bus master; and
transmit a signaling pattern configured to terminate transmission of the data after signaling the error.

19. A method for transmitting data from a device coupled to a serial bus, comprising:
encoding the data in transitions between pairs of symbols in a sequence of symbols, each symbol defining signaling state of the serial bus;
transmitting the sequence of symbols over the serial bus;
transmitting an indicator of an error signaling window in signaling state of two wires of the serial bus by toggling a first wire of the two wires of the serial bus after each of three or more symbol intervals while maintaining a second wire of the two wires of the serial bus in a first signaling state, wherein the first wire of the two wires of the serial bus is toggled after each of three or more symbol intervals while the second wire of the two wires of the serial bus is maintained in a second signaling state when a synchronizing pattern is transmitted over the serial bus, and wherein indicators of the error signaling window correspond to a prohibited combination of symbols or a delay in control signaling;
receiving signaling in the error signaling window indicating an error in the sequence of symbols or an error in timing of the indicators of the error signaling window; and
terminating transmission of the data when the signaling indicating the error is received in the error signaling window.

20. The method of claim 19, further comprising:
encoding the data using a phase-differential encoder; and
generating the indicators of the error signaling window using a circuit that operates independently of the phase-differential encoder.

21. The method of claim 19, further comprising:
transmitting the indicators of the error signaling window at a preconfigured time or location in the sequence of symbols.

22. The method of claim 19, further comprising:
generating a high data-rate (HDR) error signaling window indicator by delaying an HDR early termination pattern.

23. A data communication apparatus, comprising:
a bus interface configured to couple the data communication apparatus to a serial bus;
a phase-differential encoder configured to encode data in transitions between pairs of symbols in a sequence of symbols, each symbol defining signaling state of the serial bus; and
a processor configured to:
transmit an indicator of an error signaling window in signaling state of two wires of the serial bus by toggling a first wire of the two wires of the serial bus after each of three or more symbol intervals while maintaining a second wire of the two wires of the serial bus in a first signaling state, wherein the first wire of the two wires of the serial bus is toggled after each of three or more symbol intervals while the second wire of the two wires of the serial bus is maintained in a second signaling state when a synchronizing pattern is transmitted over the serial bus, and wherein indicators of the error signaling window comprise a prohibited combination of symbols or a delay in control signaling;
receive signaling in the error signaling window indicating an error in the sequence of symbols or an error in timing of the indicators of the error signaling window; and
terminate transmission of the data when the signaling indicating the error is received in the error signaling window.

24. The data communication apparatus of claim 23, further comprising:
a signaling circuit configured to generate the indicators of the error signaling window independently of the phase-differential encoder.

25. The data communication apparatus of claim 24, wherein the signaling circuit is further configured to:
generate a high data-rate (HDR) error signaling window indicator by delaying an HDR early termination pattern.

26. The data communication apparatus of claim 24, wherein the signaling circuit is further configured to:
cause the bus interface to transmit the indicators of the error signaling window at a preconfigured time or location in the sequence of symbols.

\* \* \* \* \*